US011639147B2

(12) United States Patent
Jaradi et al.

(10) Patent No.: US 11,639,147 B2
(45) Date of Patent: May 2, 2023

(54) MOVEABLE FLOOR SUPPORTED AIRBAG

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/336,645

(22) Filed: Jun. 2, 2021

(65) Prior Publication Data

US 2022/0388466 A1 Dec. 8, 2022

(51) Int. Cl.
 *B60R 21/20* (2011.01)
 *B60R 21/231* (2011.01)
 *B60R 21/015* (2006.01)
 *B60N 2/14* (2006.01)
 *B60R 21/00* (2006.01)

(52) U.S. Cl.
 CPC ........ *B60R 21/20* (2013.01); *B60R 21/01538* (2014.10); *B60R 21/01554* (2014.10); *B60R 21/23138* (2013.01); *B60N 2/143* (2013.01); *B60R 2021/006* (2013.01)

(58) Field of Classification Search
 None
 See application file for complete search history.

(56) References Cited

U.S. PATENT DOCUMENTS

| 5,630,616 | A | * | 5/1997 | McPherson | B60R 21/207 280/730.2 |
| 5,678,852 | A | * | 10/1997 | Brown | B60R 21/21 280/730.2 |
| 6,851,655 | B2 | | 2/2005 | Kume et al. | |
| 7,802,809 | B2 | * | 9/2010 | Ryan | B60R 21/213 280/730.2 |
| 8,702,120 | B2 | * | 4/2014 | Kalisz | B60N 2/986 280/743.1 |
| 9,744,932 | B1 | | 8/2017 | Faruque et al. | |
| 10,696,189 | B2 | | 6/2020 | Brackenbury et al. | |
| 10,821,928 | B2 | | 11/2020 | Deng et al. | |
| 11,097,680 | B2 | * | 8/2021 | Jayakar | B60R 21/232 |
| 11,142,157 | B2 | * | 10/2021 | Kim | B60N 2/002 |
| 11,279,307 | B2 | * | 3/2022 | Humer | B60N 2/42736 |
| 11,400,883 | B2 | * | 8/2022 | Yamada | B60R 21/2338 |
| 2020/0079243 | A1 | | 3/2020 | Bork et al. | |

(Continued)

FOREIGN PATENT DOCUMENTS

| CN | 110509884 | A | * | 11/2019 | ............ B60R 21/20 |
| CN | 210653007 | U | * | 6/2020 | |

(Continued)

*Primary Examiner* — Faye M Fleming
(74) *Attorney, Agent, or Firm* — Frank A. MacKenzie; Bejin Bieneman PLC

(57) ABSTRACT

A vehicle includes a floor and a seat supported by the floor. The seat is translatable relative to the floor along a longitudinal axis of the vehicle. An airbag housing is supported by the floor and is disposed alongside the seat. The airbag housing is translatable relative to the floor along the longitudinal axis. An airbag is supported by the airbag housing. The airbag is inflatable to an inflated position that extends from the airbag housing away from the floor.

20 Claims, 16 Drawing Sheets

(56) References Cited

U.S. PATENT DOCUMENTS

| | | |
|---|---|---|
| 2020/0290549 A1 | 9/2020 | Buice et al. |
| 2020/0346607 A1 | 11/2020 | Kim et al. |
| 2021/0078517 A1 * | 3/2021 | Fischer ............. B60R 21/01516 |
| 2021/0300292 A1 * | 9/2021 | Yamada ................. B60N 2/688 |

FOREIGN PATENT DOCUMENTS

| | | | | |
|---|---|---|---|---|
| DE | 102014000863 A1 * | 8/2014 | ............. | B60R 21/20 |
| JP | 2007320389 A * | 12/2007 | | |
| JP | 2017065556 A | 4/2017 | | |
| KR | 102005746 B1 | 7/2019 | | |
| WO | 2020088917 A1 | 5/2020 | | |

\* cited by examiner

MOVEABLE FLOOR SUPPORTED AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
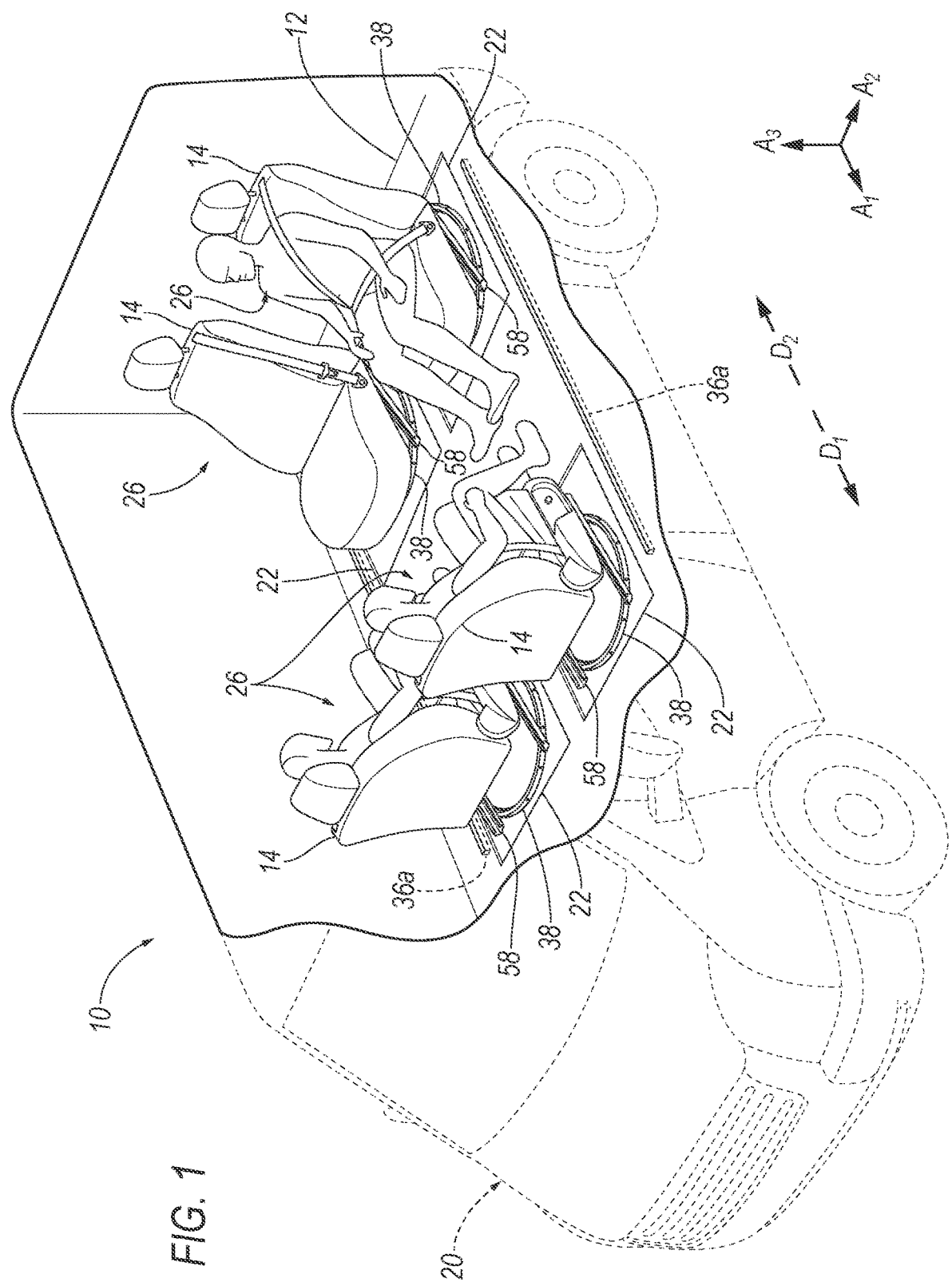
FIG. 1 is a perspective view of a vehicle including a track supported by a floor and disposed outboard of a recess in the floor.

A vehicle includes a floor. A seat is supported by the floor. The seat is translatable relative to the floor along a vehicle-longitudinal axis. An airbag housing is supported by the floor and is disposed alongside the seat. The airbag housing is translatable relative to the floor along the vehicle-longitudinal axis. An airbag is supported by the airbag housing. The airbag is inflatable to an inflated position that extends from the airbag housing away from the floor.

The vehicle may include a track mounted to the floor and elongated along the vehicle-longitudinal axis. The airbag housing may be slidably engaged with the track.

The track may be disposed outboard of the seat relative to a vehicle-lateral axis.

The vehicle may include a computer having a processor and a memory storing instructions executable by the processor to move the airbag based on determining a position of the seat.

The memory may store further instructions executable by the processor to control inflation of the airbag based on an occupancy of the seat.

The seat may be rotatable relative to the floor about a vertical axis. The memory may store further instructions executable by the processor to move the airbag additionally based on determining an orientation of the seat about the vertical axis.

The vehicle may include an actuator supported by the floor and designed to move the airbag housing.

The seat may define an occupant seating area. The airbag may be designed to extend alongside the occupant seating area in the inflated position.

The vehicle may include a panel removably attached to and supported by the floor. The panel may be designed to engage a personal mobility device.

The vehicle may include a computer having a processor and memory storing instructions executable by the processor to move the airbag based on determining a position of the panel.

The memory may store further instructions executable to control inflation of the airbag based on detecting a personal mobility device engaged with the panel.

The vehicle may include a second airbag housing supported by the floor and disposed alongside the seat opposite the airbag housing. The second airbag housing may be translatable relative to the floor along the vehicle-longitudinal axis. The vehicle may include a second airbag supported by the second airbag housing. The second airbag may be inflatable to an inflated position that extends from the second airbag housing away from the floor.

The seat may define an occupant seating area. The airbag and the second airbag may be spaced from each other along a cross-vehicle axis and each may be designed to extend alongside the occupant seating area in the inflated position.

The vehicle may include a computer having a processor and a memory storing instructions executable by the processor to move the airbag and the second airbag based on determining a position of the seat.

A system includes a computer including a processor and a memory, the memory storing instructions executable by the processor to determine a position of a seat in response to determining the seat is attached to a floor of a vehicle. The memory stores further instructions to move an airbag along the floor based on the position of the seat.

The memory may store further instructions to, upon determining an orientation of the seat, move the airbag along the floor additionally based on the orientation of the seat.

The memory may store further instructions to control inflation of the airbag based an occupancy of the seat.

The memory may store further instructions to move a second airbag along the floor based on the position of the seat, the seat being disposed between the airbag and the second airbag.

The memory may store further instructions to determine a position of a panel in response to determining the panel is attached to the floor. The memory may store further instructions to move the airbag along the floor based on the position of the panel.

The memory may store further instructions to control inflation of the airbag in response to a personal mobility device being engaged with the panel.

With reference to the Figures, wherein like numerals indicate like parts throughout the several views, a vehicle 10 is generally shown. The vehicle 10 includes a floor 12 and a seat 14 supported by the floor 12. The seat 14 is translatable relative to the floor 12 along a longitudinal axis A1 of the vehicle 10. An airbag housing 16a is supported by the floor 12 and is disposed alongside the seat 14. The airbag housing 16a is translatable relative to the floor 12 along the longitudinal axis A1. An airbag 18a is supported by the airbag housing 16a. The airbag 18a is inflatable to an inflated position that extends from the airbag housing 16a away from the floor 12.

During a vehicle 10 impact, the seat 14 may be in any one of a number of positions along a seat track 58 and may be facing in any one of a number of directions, e.g., a vehicle-forward direction D1 or a vehicle-rearward direction D2. The airbag 18a may be moved to a position based on the position and facing direction of the seat 14. During a vehicle impact, the airbag 18a may be inflated from an uninflated position, as shown in FIGS. 1, 3A, 4A, 5A, 7A, 8A, and 9, to an inflated position, as shown in FIGS. 2, 3B, 4B, 5B, 7B, and 8B. The airbag 18a may provide coverage so as to control the kinematics of the occupant. During side and oblique impacts, e.g., far side oblique impacts, near side impacts, etc., the occupant is urged at an angle relative to vehicle-forward. During these types of impacts, the occupant may be forced into the airbag 18a in the inflated position. By moving the airbag 18a based on the position and facing direction of the seat 14, the airbag 18a may increase the likelihood that the occupant's kinematics are controlled during side and oblique impacts regardless of the position and facing direction of the seat 14.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 defines a longitudinal axis A1, e.g., extending between a front and a rear of the vehicle 10. The vehicle 10 defines a lateral axis A2, e.g., extending between a left side and a right side of the vehicle 10. The vehicle 10 defines a vertical axis A3, e.g., extending between a top and a bottom of the vehicle 10. The longitudinal axis A1, the lateral axis A2, and the vertical axis A3 are perpendicular to each other.

With reference to FIG. 1, the vehicle 10 includes a body 20. The body 20 may be of a unibody construction. In the unibody construction, the body 20 serves as a frame, and the body 20 (including the rockers, pillars, roof rails, etc.) is unitary, i.e., a continuous one-piece unit. As another example, the body 20 and frame may have a body-on-frame construction (also referred to as a cab-on-frame construction). In other words, the body 20 and frame are separate components, i.e., are modular, and the body 20 is supported on and affixed to the frame. Alternatively, the body 20 may have any suitable construction. The body 20 may be formed of any suitable material, for example, steel, aluminum, etc.

The body 20 defines a passenger cabin (not numbered) to house occupants, if any, of the vehicle 10. The passenger cabin may extend across the vehicle 10, i.e., from one side to the other side of the vehicle 10. The passenger cabin includes a front end and a rear end with the front end being in front of the rear end during forward movement of the vehicle 10. The passenger cabin may house one or more seats 14 and/or personal mobility devices 28.

The floor 12 is spaced from a roof (not numbered) along the vertical axis A3. Specifically, the floor 12 is below the roof. The roof may define an upper boundary of the passenger cabin and may extend from the front end of the passenger cabin to the rear end of the passenger cabin. The floor 12 may define the lower boundary of the passenger cabin and may extend from the front end of the passenger cabin to the rear end of the passenger cabin. That is, the passenger cabin may extend from the floor 12 to the roof.

The floor 12 may include a plurality of recesses 22 extending away from the roof. The floor 12 may include upholstery, for example, carpet, and may have a class-A surface facing the passenger cabin, i.e., a surface specifically manufactured to have a high quality, finished, aesthetic appearance free of blemishes. The upholstery may be outside the recesses 22 and extend to a boundary of the recesses 22. Each recess 22 may be designed to support one seat 14 or one panel 24. That is, one seat 14 or one panel 24 may engage the floor 12 in one respective recess 22.

Figure 2:
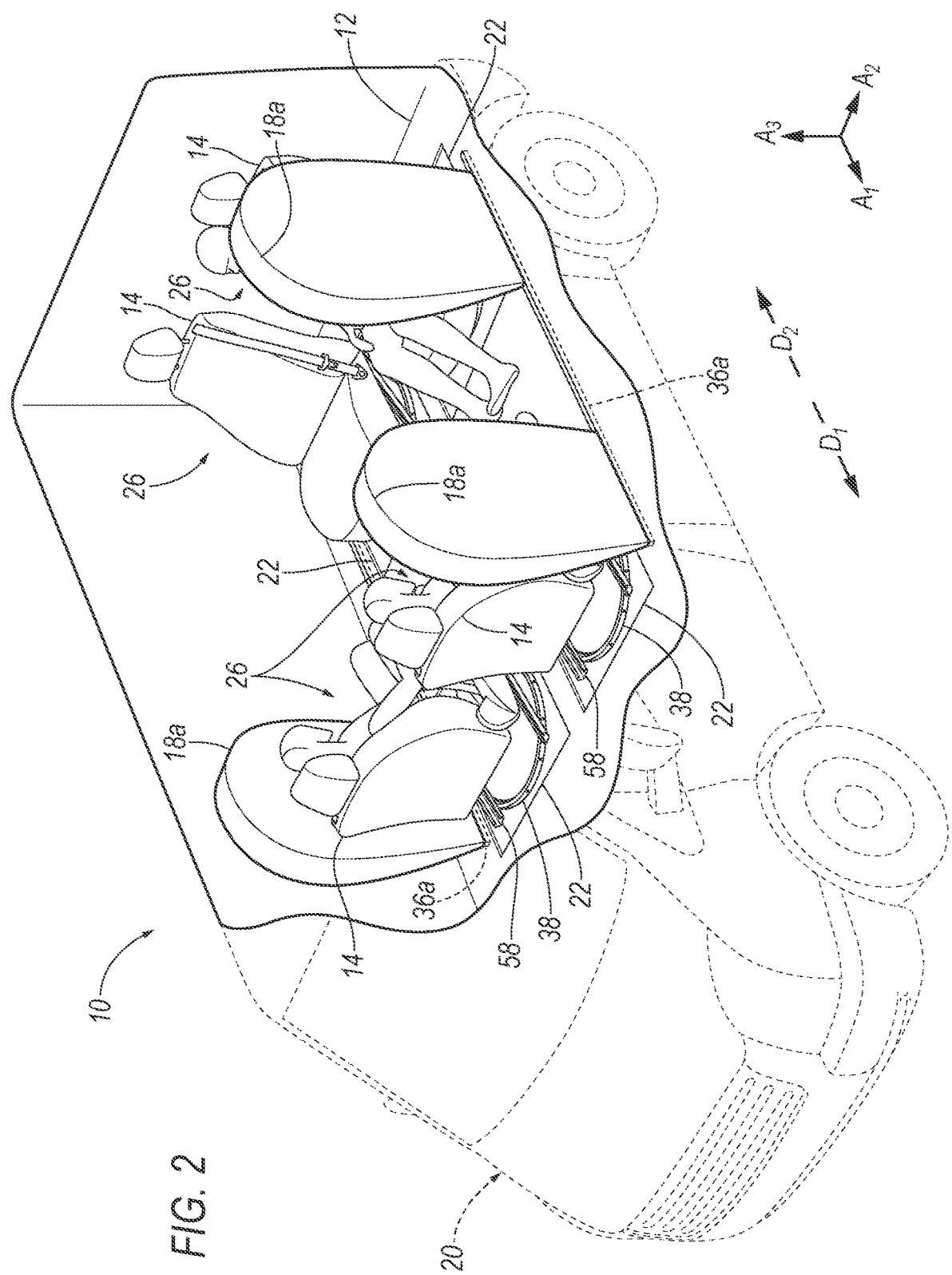
FIG. 2 is a perspective view of the vehicle having a plurality of airbags supported by the track in an inflated position.
Figure 3A:
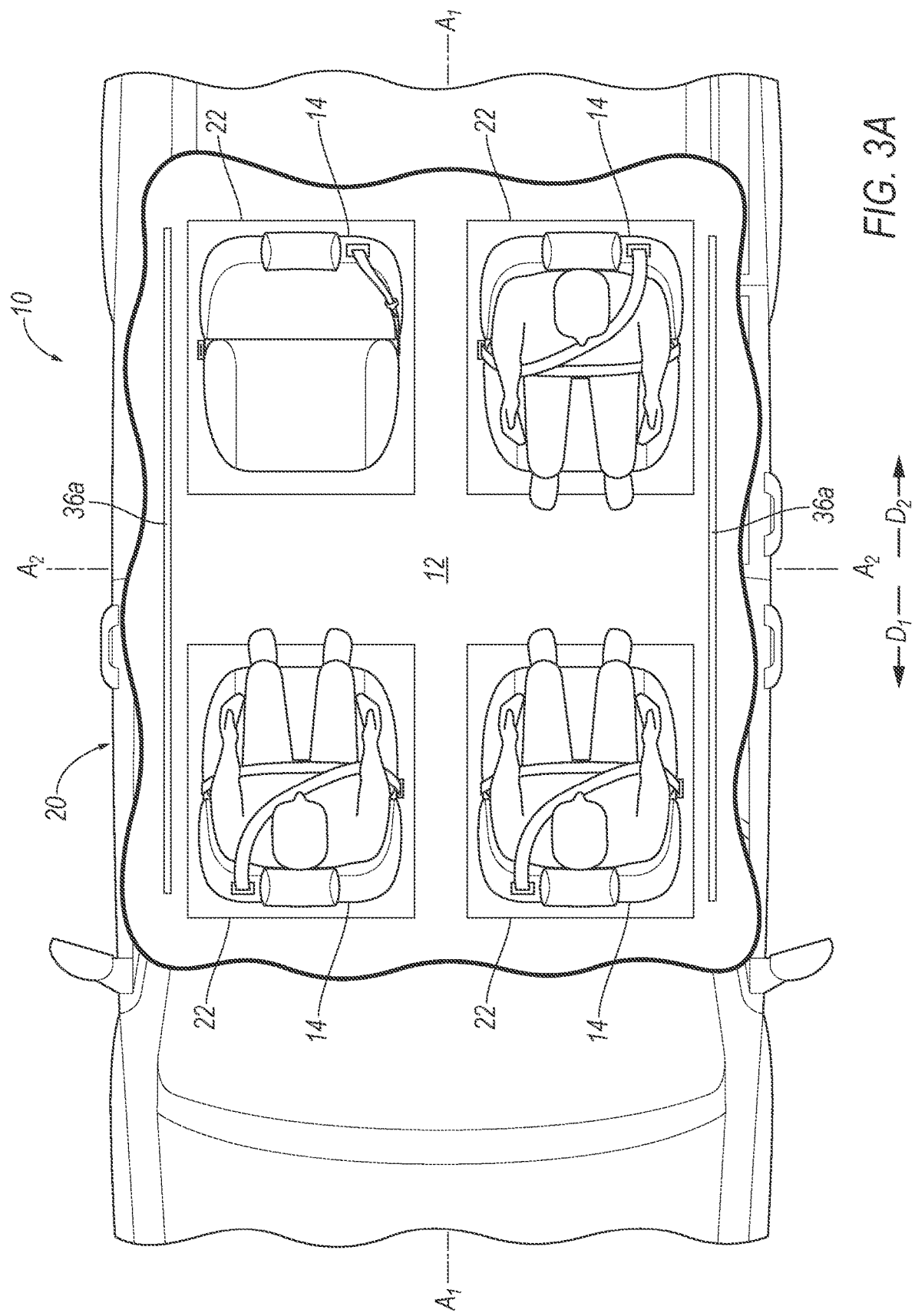
FIG. 3A is a top view of the vehicle of FIG. 1.
Figure 3B:
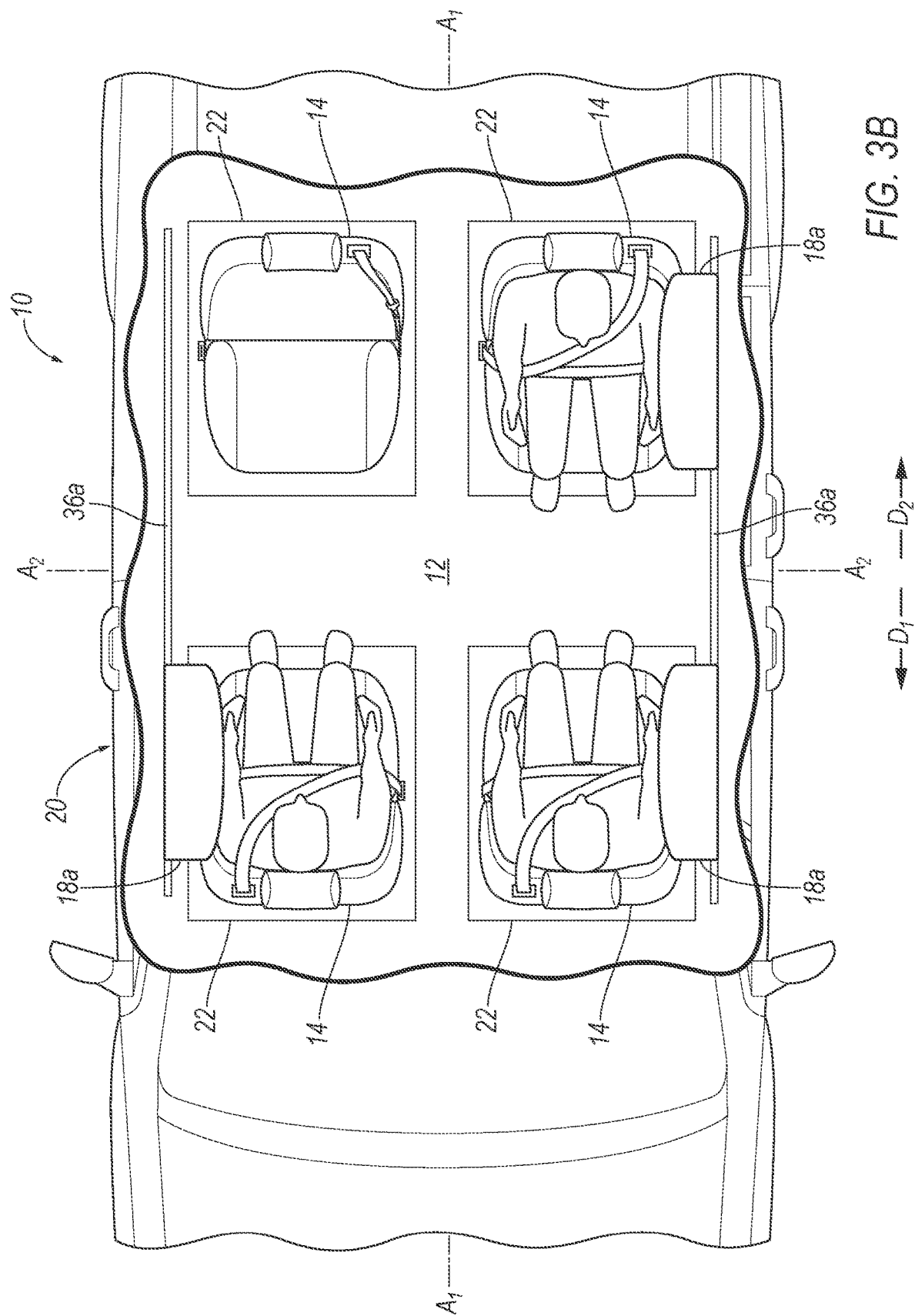
FIG. 3B is a top view of the vehicle of FIG. 2.
Figure 4A:
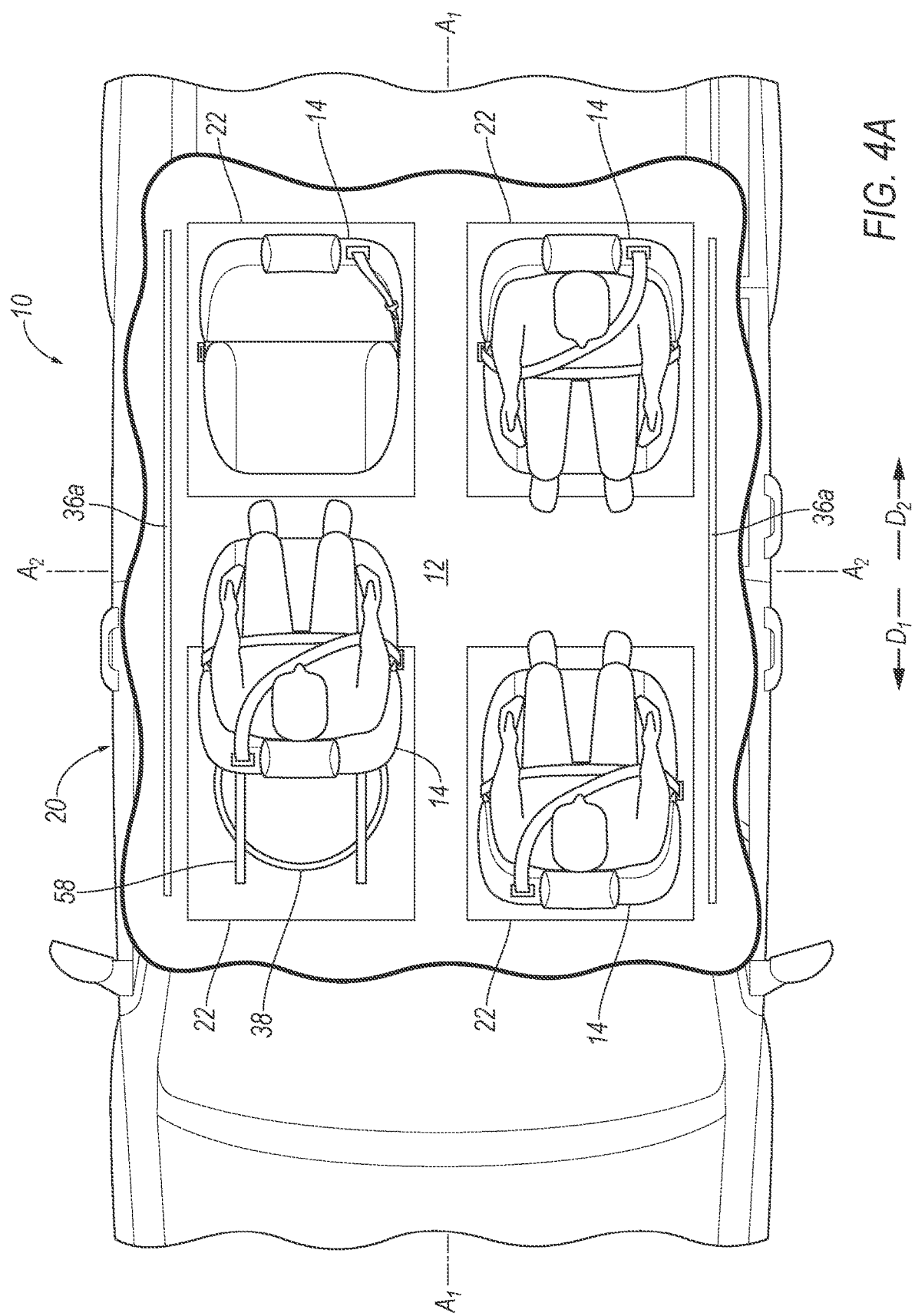
FIG. 4A is a top view of the vehicle including one front seat translated along a longitudinal axis of the vehicle.
Figure 4B:
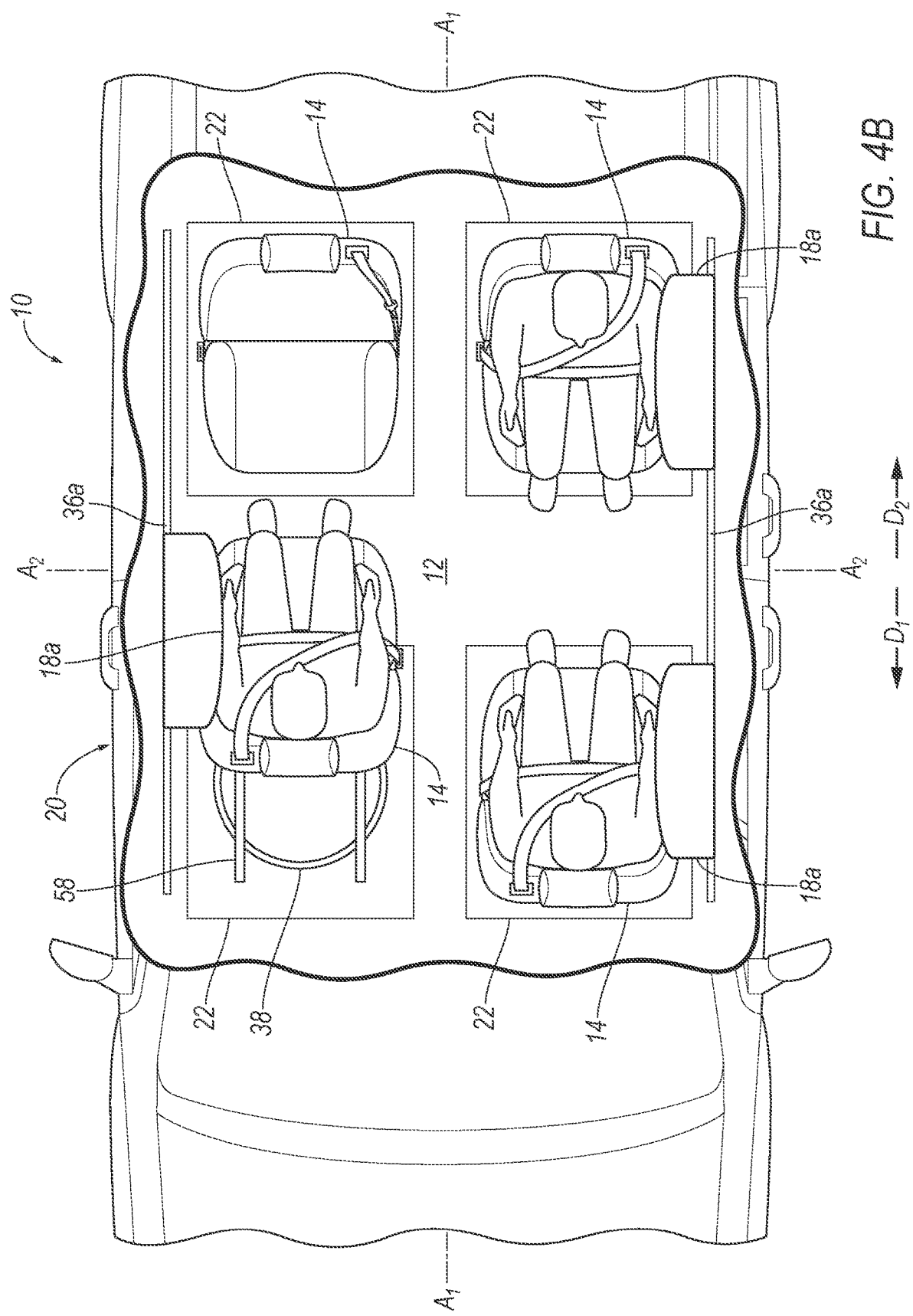
FIG. 4B is a top view of the vehicle including an airbag in the inflated position adjacent to the translated front seat.

With reference to FIGS. 1-2, the vehicle 10 includes an occupant seating area 26 above the floor 12. Specifically, one occupant seating area 26 is above each respective recess 22, i.e., aligned with the respective recess 22 and between the respective recess 22 and the roof. The occupant seating area 26 is an area in the passenger cabin of the vehicle 10 that is occupied by a seated occupant during operation of the vehicle 10. The occupant seating area 26 may be designed to house a seat 14 or a personal mobility device 28, as described further below. The vehicle 10 may include more than one occupant seating area 26 with at least one occupant seating area 26 designed to house one seat 14 or one personal mobility device 28. The vehicle 10 may be reconfigured to change the occupant seating area 26 between one designed to house the seat 14 and one designed to house the personal mobility device 28. The occupant seating area 26 may extend from the floor 12 to an uppermost point on the seat 14 or the personal mobility device 28, i.e., towards the roof. For example, the occupant seating area 26 may extend from the floor 12 to the uppermost point on an occupant seated in the occupant seating area 26.

With continued reference to FIG. 1, the vehicle 10 includes at least one seat 14. Specifically, the vehicle 10 may include any suitable number of seats 14. As shown in FIG. 1, the seats 14 are supported by the floor 12. The seats 14 may be arranged in any suitable arrangement in the passenger cabin. For example, one or more of the seats 14 may be at the front end of the passenger cabin, e.g., a driver seat 14 and/or a passenger seat 14, and/or one or more of the seats 14 may be at the rear end of the passenger cabin, i.e., a rear seat 14.

Each seat 14 is supported by the floor 12, as shown in FIG. 1. The position of the seats 14 relative to the floor 12 may be adjustable by an occupant. The seat 14 may be selectively slidable relative to the seat track 58 (see FIGS. 4A and 4B). In other words, the occupant may slide the seat 14 along the seat track 58 and may secure the seat 14 to the seat track 58 at selected positions. For example, the occupant may actuate a motor (not shown) that moves the seat 14 along the seat track 58.

Figure 5A:
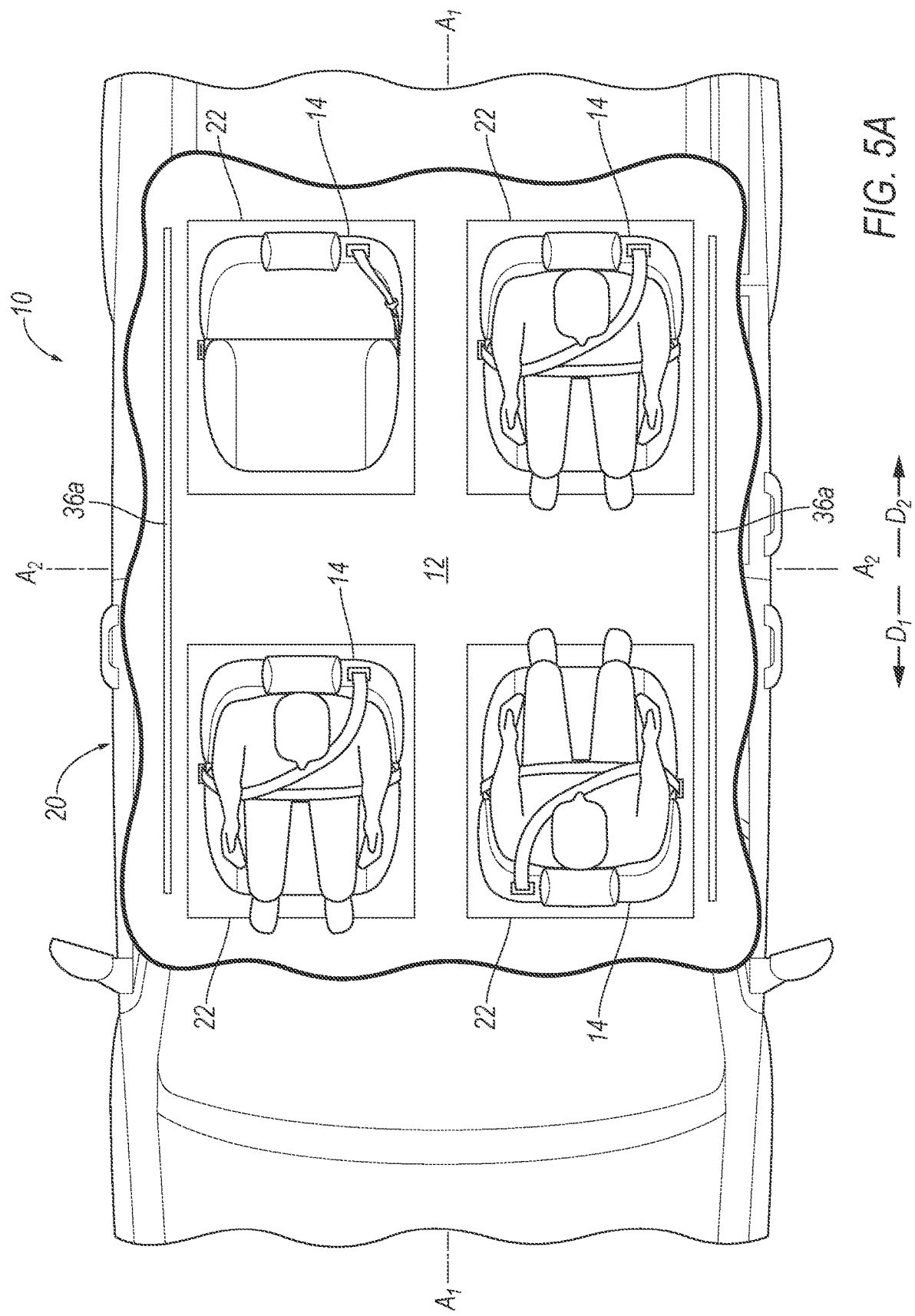
FIG. 5A is a top view of the vehicle including one front seat facing a vehicle-forward direction and another front seat facing a vehicle-rearward direction.
Figure 5B:
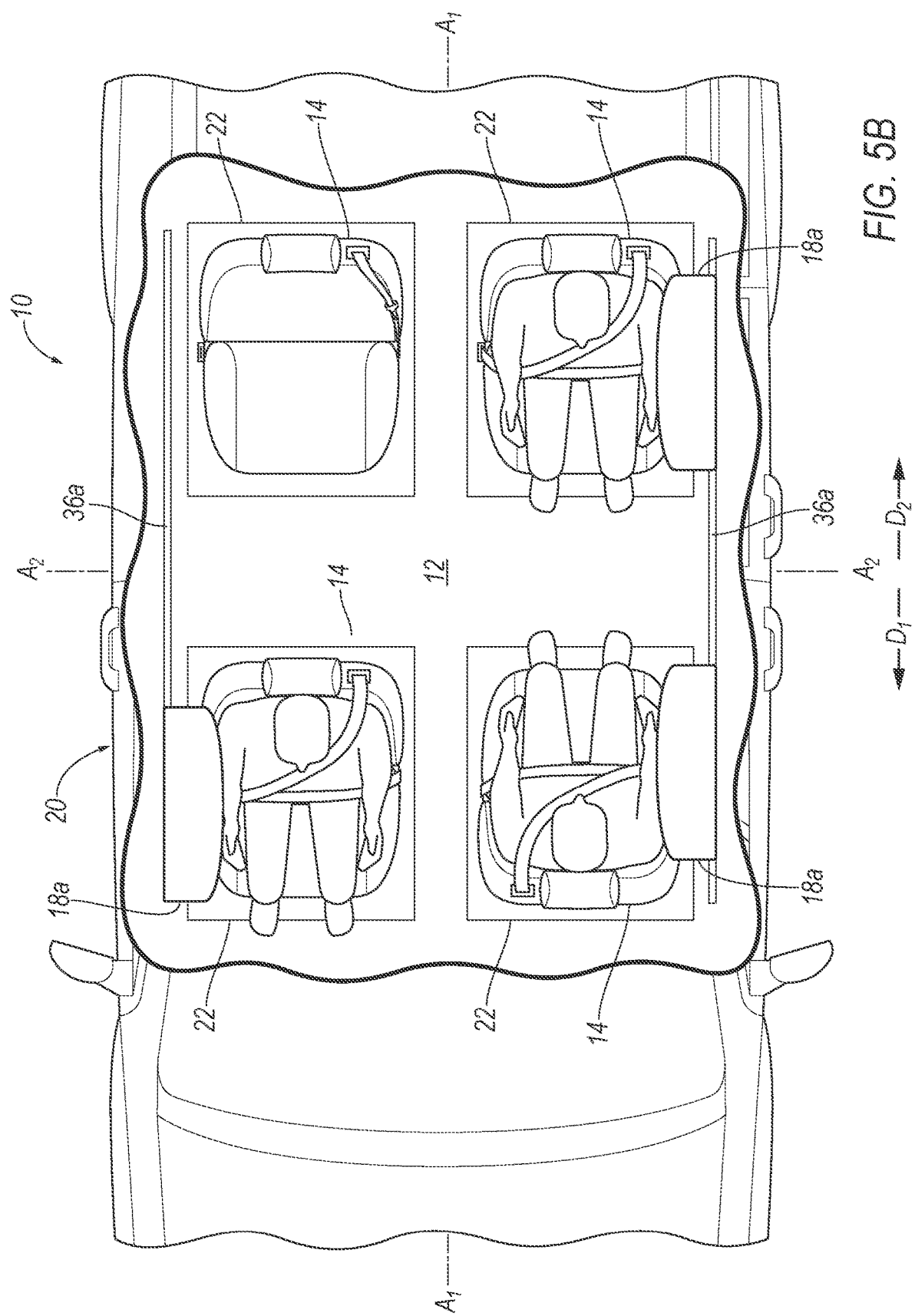
FIG. 5B is a top view of the vehicle including airbags in the inflated position adjacent to the respective front seats.

Additionally, or alternatively, each seat 14 may be rotatable relative to the floor 12. The seats 14 may include a rotation mechanism 38 for rotating the respective seat 14 about a generally vertical axis A3. The rotation mechanism 38 may be any suitable structure for rotating the respective seat 14, e.g., a rotatable post, rings rotatable relative to each other, etc. In other words, the seats 14 may be rotatable to face in different directions. For example, the seats 14 may rotate between a vehicle-forward position, a vehicle-rearward position, a vehicle-rightward position, a vehicle-leftward position, and/or positions therebetween. As shown in FIGS. 5A and 5B, one front seat 14 is in the vehicle-forward position and the other front seat 14 is in the vehicle-rearward position. In the vehicle-forward position, an occupant of the seat 14 faces the front end of the passenger cabin, i.e., the vehicle-forward direction D1. In the vehicle-rearward position, an occupant of the seat 14 faces the rear end of the passenger cabin, i.e., the vehicle-rearward direction D2. The seats 14 may rotate completely, i.e., 360° about the generally vertical axis A3.

The seats 14 may be removably attached to the floor 12, i.e., the seats 14 may not be permanently fixed to the floor 12. In an example where the seat 14 is installed, the seat 14 may be installed in one recess 22. The seat 14 may include a fastener, e.g., screws, threaded bolts, etc., to removably attach the seat 14, e.g., the seat track 58 and/or rotation mechanism 38, with the floor 12. The fastener may be removed from the seat 14 to remove the seat 14 from the passenger cabin.

Each seat 14 may include a seat wiring harness (not shown). The seat wiring harness transmits signals to and from components of the seat 14 and may provide power to components of the seat 14. The seat wiring harness may be releasably connectable to a computer 34 of the vehicle 10, e.g., a restraints control module (RCM), and the computer 34 transmits signals to and/or receives signals from components of the seat 14, e.g., seat belt assemblies, seat position sensors 50, etc.

Figure 6:
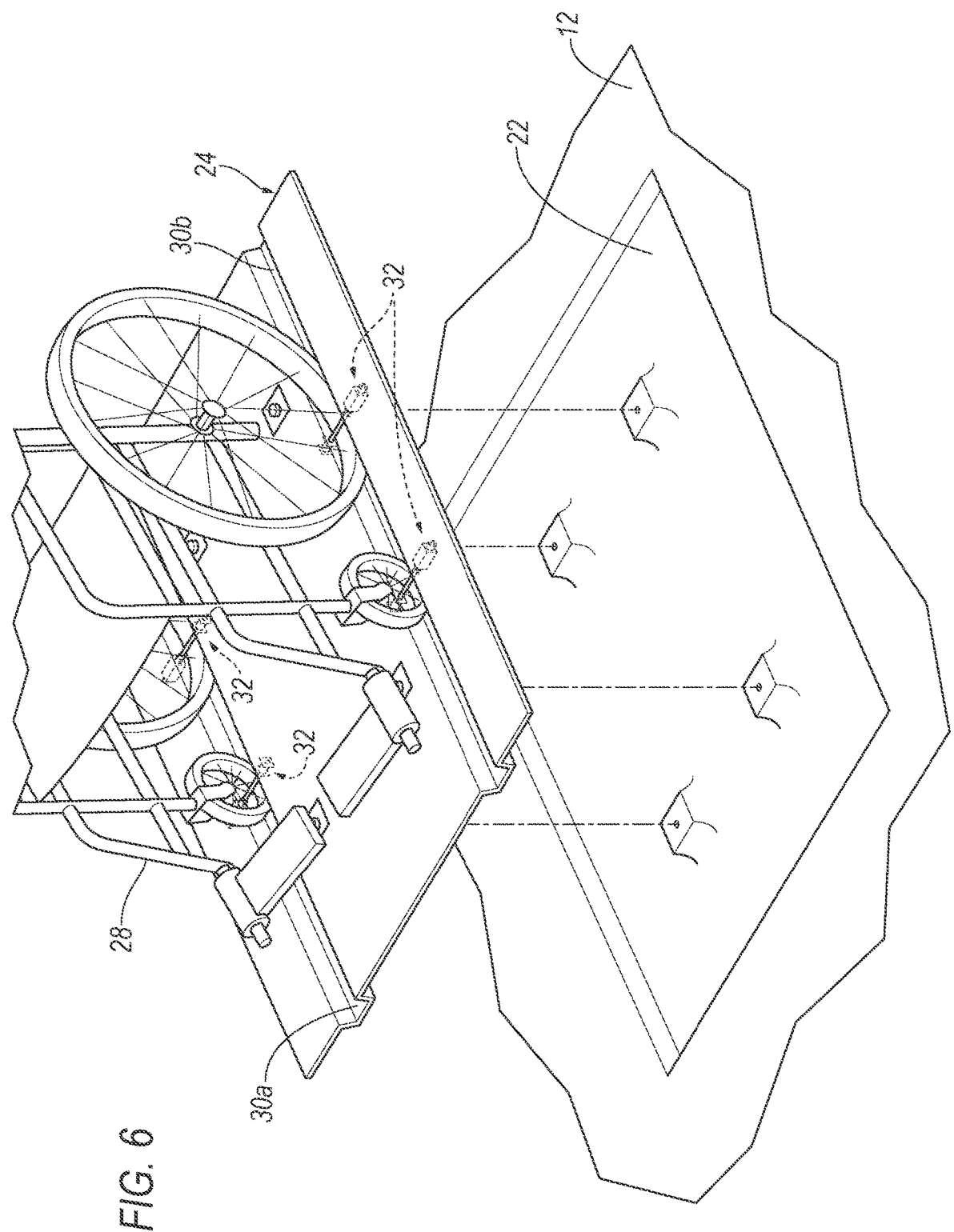
FIG. 6 is a perspective view of a panel in a recess in the floor and engaged with a wheel of a personal mobility device.
Figure 7A:
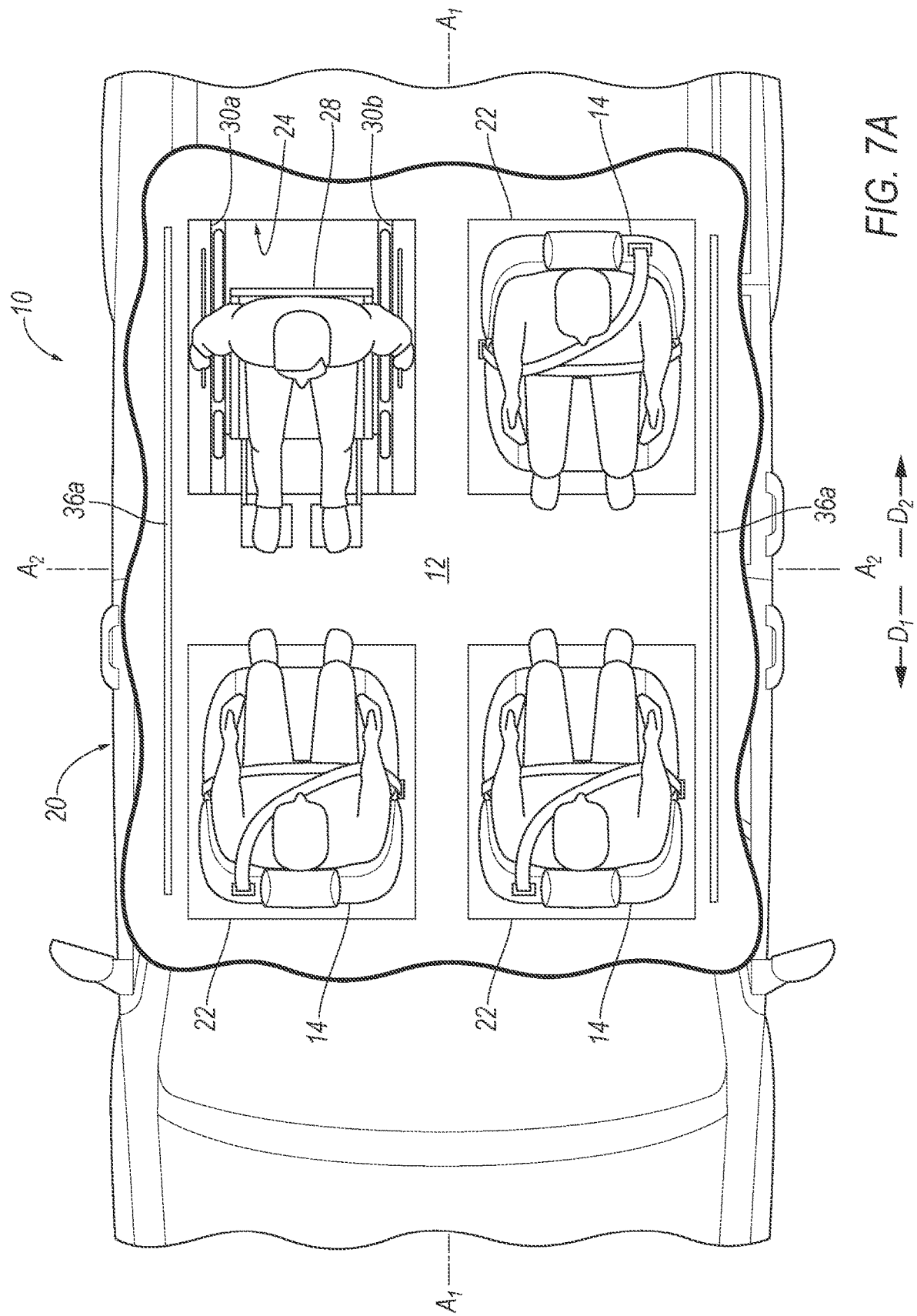
FIG. 7A is a top view of the vehicle including the personal mobility device engaged in the panel.
Figure 7B:
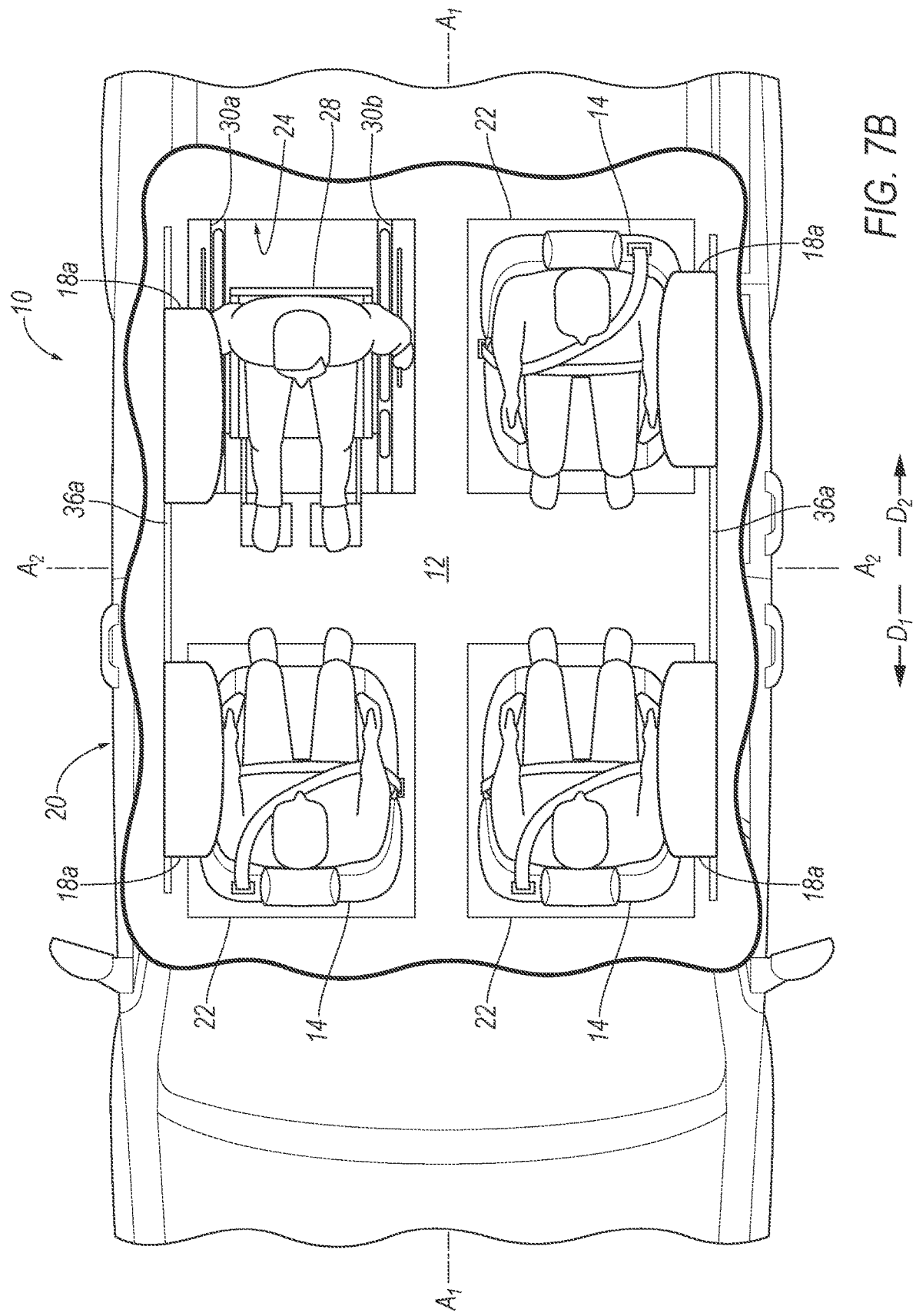
FIG. 7B is a top view of the vehicle including an airbag in the inflated position adjacent to the personal mobility device.

With reference to FIGS. 6-7B, a panel 24 may be installed in the vehicle 10 to replace a seat 14 in the vehicle 10. The panel 24 may be removably attached to and supported by the floor 12, i.e., the panel 24 is not permanently fixed to the floor 12. As shown in FIGS. 7A and 7B, a seat 14 in the vehicle 10, such a rear seat 14, may be removed from the vehicle 10 to replace the seat 14 with the panel 24. In other words, when a seat 14 is removed from the vehicle 10, the panel 24 may take the place of the seat 14 in the vehicle 10. If the panel 24 no longer is needed in the vehicle 10, the panel 24 may be removed from the vehicle 10 and replaced with the seat 14 that was removed. At any time, e.g., at the time of assembly or afterward by a service technician, the seat 14 and the panel 24 may be interchanged at any selected location in the vehicle 10.

There may be any suitable number of panels 24 in the vehicle 10. In the examples shown in FIGS. 1-5B and 8A-8B, the vehicle 10 includes no panels 24. In the example shown in FIGS. 7A-7B, the vehicle 10 includes one panel 24.

In an example where the panel 24 is installed in the vehicle 10, the panel 24 may be installed in one recess 22. An edge of the panel 24 may abut an edge of the upholstery on the floor 12, i.e., the edge of the panel 24 may be aligned with the edge of the upholstery to make a flat surface on the floor 12. The panel 24 may include fasteners, e.g., screws, threaded bolts, etc., to engage the panel 24 to the floor 12. The fasteners extend through the panel 24 to removably attach the panel 24 to the floor 12.

With reference to FIG. 6, the panel 24 may include a pair of channels 30 spaced from each other along the lateral axis A2. The panel 24 is designed to engage wheels of the personal mobility device 28. That is, when the panel 24 is installed, a personal mobility device 28 may be engaged with the panel 24. Specifically, the channels 30 of the panel 24 are designed to engage wheels of a personal mobility device 28. The channels 30 are designed to receive the wheels of a personal mobility device 28 when a personal mobility device 28 is in the passenger cabin of the vehicle 10.

The channels 30 are spaced from and parallel to each other. The pair of channels 30 may be referenced as a first channel 30*a* and a second channel 30*b*. The channels 30 may be elongated along the panel 24. For example, as shown in FIGS. 6-7B, the channels 30 may be elongated along the entire length of the panel 24, i.e., from one end of the panel 24 to the other. In another example, the channels 30 may be elongated only along a portion of the panel 24. The channels 30 may extend longitudinally in the vehicle 10, i.e., the channels 30 extend longitudinally between the front end and rear end of the passenger cabin. Extending longitudinally allows the wheels of a personal mobility device 28 to roll into the channels 30 when the panel 24 is in use in the vehicle 10.

With reference to FIG. 6, the panel 24 may include a latch 32 that secures the wheel of a personal mobility device 28 when the wheel is disposed in one of the channels 30 of the panel 24. The latch 32 is positioned adjacent one of the channels 30 such that the latch 32 may engage a wheel of the personal mobility device 28 in the respective channel 30.

The panel 24 may include a plurality of latches 32. The panel 24 may include any suitable number of latches 32 to secure the wheels of the personal mobility device 28 and limit the movement of the personal mobility device 28 in the channels 30. For example, the number of latches 32 may be equal to the number of wheels of the personal mobility device 28. In the example shown in the Figures, the panel 24 includes four latches 32, one latch 32 for each of the four wheels of the personal mobility device 28. In such an example, two latches 32 are spaced from each other adjacent the first channel 30*a* and two latches 32 are spaced from each other adjacent the second channel 30*b*.

The latches 32 are designed to releasably engage a personal mobility device 28 between an unlatched position and a latched position. That is, the latches 32 are moveable between an unlatched position and a latched position. When the latches 32 are in the unlatched position, the latches 32 are retracted from the channels 30, i.e., the latch 32 is drawn away from the channel 30 when the latch 32 is in the unlatched position. In the unlatched position, the wheels of the personal mobility device 28 may be free to roll and/or move within the channels 30. When the latches 32 are in the latched position, the latches 32 are elongated across the channels 30 and through the wheel of the personal mobility device 28. The latch 32 limits the rolling and movement of the wheels of the personal mobility device 28 by extending through the wheel, i.e., between the spokes, and across the channels 30. That is, in the latched position, the wheels of the personal mobility device 28 are unable to roll and/or move within the channels 30. Said differently, the personal mobility device 28 may be fixed, i.e., locked, to the panel 24.

The latches 32 may be any suitable type of latch 32. For example, the latches 32 may be manual, e.g., a spring-loaded hook manually moved between the latched and unlatched positions by a passenger of the vehicle 10. As another example, the latches 32 may be electronic, e.g., a solenoid moved between the latched and unlatched positions by an electrical signal from a computer 34.

A panel wiring harness (not shown) may be supported by the panel 24 and connected to the latches 32. Specifically, the panel wiring harness may transmit signals to and from the latch 32 and may provide power to the latch 32. As discussed below, the panel wiring harness may be releasably connectable to the computer 34 of the vehicle 10, e.g., the RCM, and the computer 34 transmits signals to and/or receives signals from the latch 32. For example, the panel wiring harness may transmit signals indicating that the latch 32 is in the latched position or the unlatched position and/or may provide instruction, i.e., a signal, to the latch 32 to move between the latched position and the unlatched position.

The panel wiring harness and the seat wiring harness may be releasably connectable to the computer 34, e.g., the RCM. The vehicle 10 may include a plurality of wiring harnesses (hereinafter referred to as "vehicle 10 wiring harnesses") connected to the computer 34. For example, the vehicle 10 may include one vehicle wiring harness at each recess 22, i.e., at each location that a seat 14 or a panel 24 may be mounted. The panel wiring harness and the seat wiring harness may be releasably connectable to the vehicle wiring harnesses, e.g., to transmit signals and/or power therethrough. For example, the panel wiring harness and the seat wiring harness may each include quick disconnect terminals, as is known in automotive application, designed to mate, alternatively, with a terminal of the vehicle wiring harness.

The personal mobility device 28 may be of any suitable type that supports a seated occupant. The personal mobility device 28 transports the seated occupant outside of the vehicle 10 and moves the seated occupant in the passenger cabin during ingress to and egress from the vehicle 10. The personal mobility device 28 supports the seated occupant in the passenger cabin during operation of the vehicle 10. The personal mobility device 28 may include wheels, as described above. As examples including wheels, the personal mobility device 28 may be a wheelchair or a scooter. As another example, the personal mobility device 28 may include a continuous track. In such an example, the continuous track is in contact with ground and personal mobility device 28 may include wheels that transmit torque to the continuous track.

Figure 9:
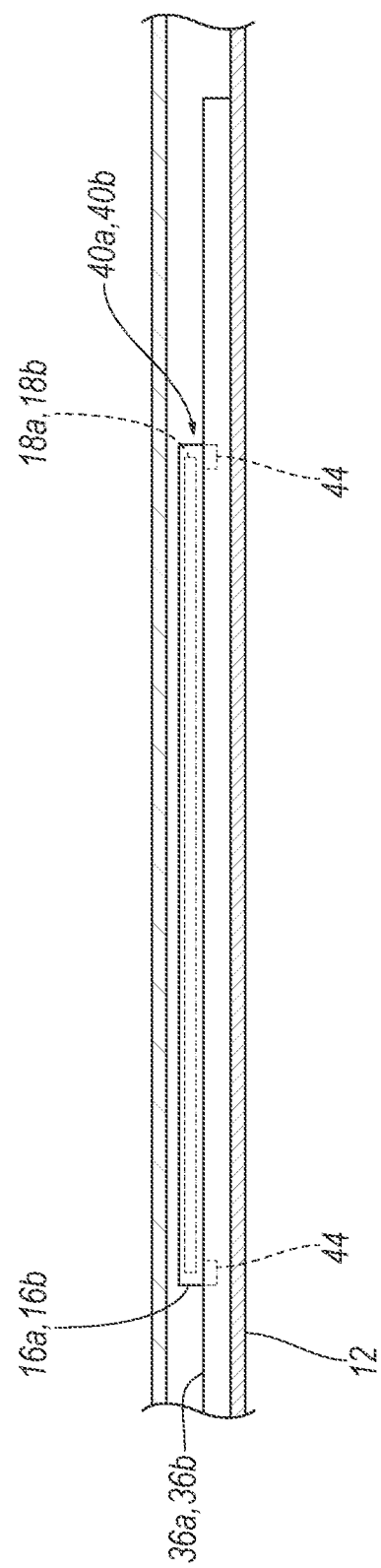
FIG. 9 is a cross section of the floor of the vehicle having an airbag in an uninflated position.

The vehicle 10 may include a track 36a supported by the floor 12, as shown in FIG. 9. For example, the track 36a may be fixed to the floor 12, e.g., via fasteners, welding, adhesive, etc. The track 36a may be fixed directly, or indirectly via one or more intermediate components, to the floor 12, e.g., via fasteners, welding, etc. The upholstery may be outside the track 36a and extend to a boundary of the track 36a, as shown in FIG. 1. In this situation, the upholstery may include bristles extending partially across the track 36a. The bristles may assist in preventing debris from entering the track 36a.

The track 36a may be disposed on one side of the vehicle 10. The track 36a may, for example, be disposed outboard relative to recesses 22 on the one side of the vehicle 10, as shown in the Figures. That is, the recesses 22 on the one side of the vehicle 10 may be disposed between the track 36a and the longitudinal axis A1 of the vehicle 10. The track 36a may be elongated along the longitudinal axis A1. In other words, the longest dimension of the track 36a is along the longitudinal axis A1.

The vehicle 10 may include a plurality of tracks 36a. For example, the vehicle 10 may include one track 36a on each side of the vehicle 10, as shown in the Figures. In such an example, each track 36a may extend alongside two recesses 22. For example, each track 36a may extend from the front end of the passenger cabin to the rear end of the passenger cabin. As another example, a number of tracks 36a may be equal to a number of recesses 22. In such an example, each track 36a may extend alongside one respective recess 22. For example, each track 36a may be spaced from one of the front end or the rear end of the passenger cabin.

Figure 8A:
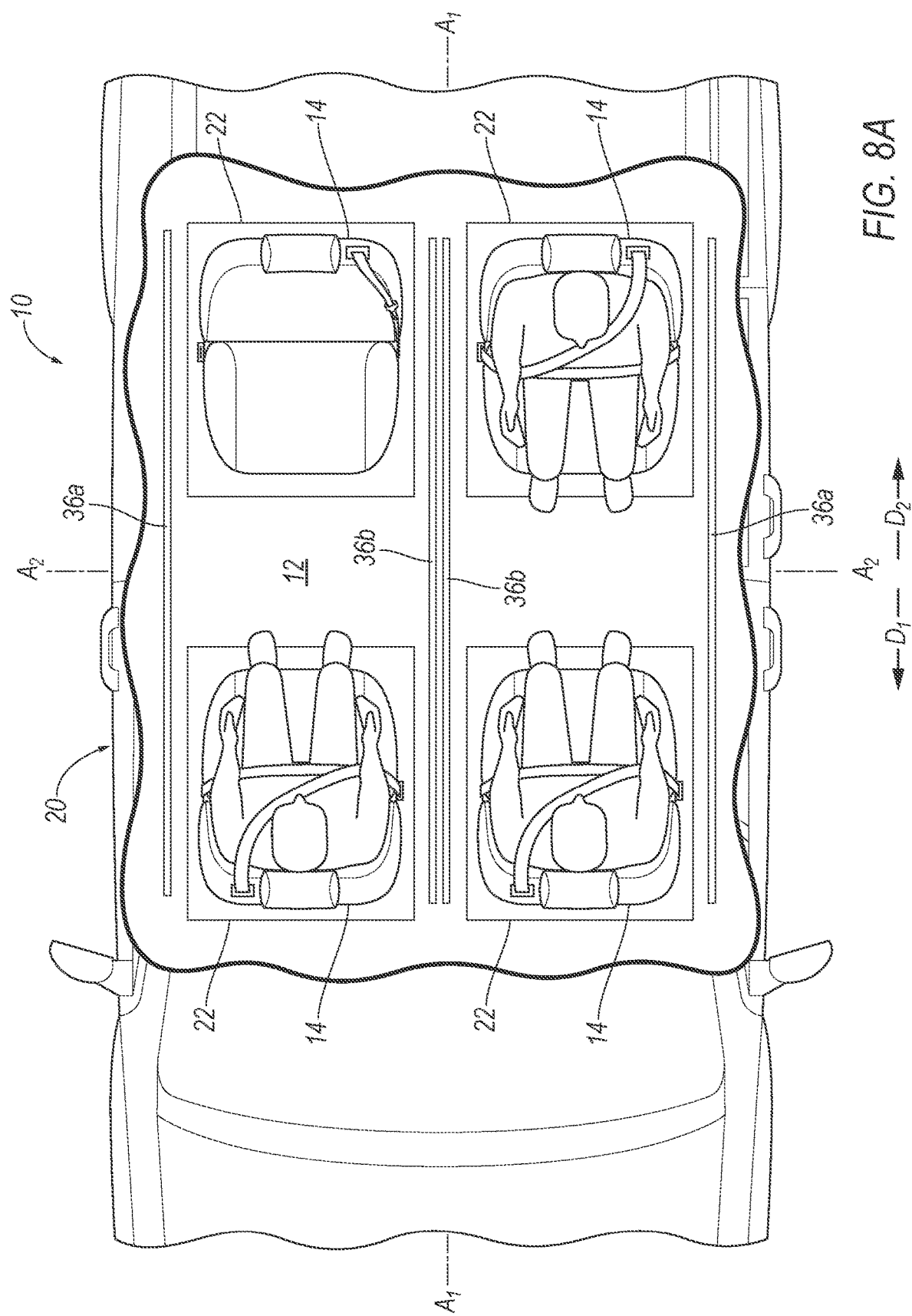
FIG. 8A is a top view of the vehicle including a second track disposed inboard of a recess.
Figure 8B:
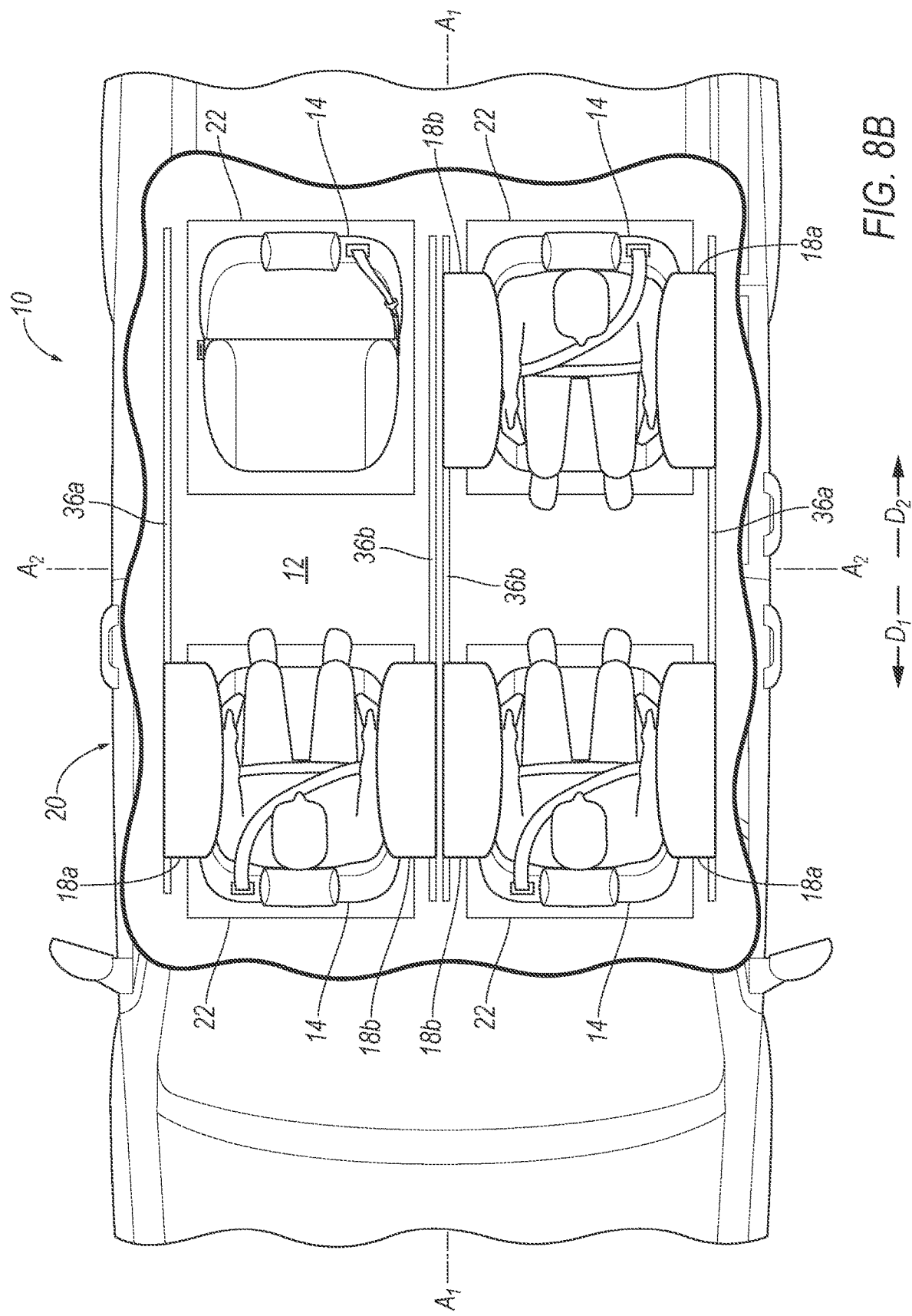
FIG. 8B is a top view of the vehicle including a plurality of second airbags in the inflated position adjacent to occupied seats.

With reference to FIGS. 8A-8B, the vehicle 10 may include a second track 36b supported by the floor 12, e.g., in substantially the same manner as the track 36a. The second track 36b may be spaced from the track 36a along the lateral axis A2. For example, the second track 36b may be disposed between recesses 22 relative to the lateral axis A2. That is, a recess 22 on the one side of the vehicle 10 may be disposed between the track 36a and the second track 36b. Said differently, the track 36a and the second track 36b may be disposed on opposite sides of a recess 22 relative to the lateral axis A2.

The second track 36b is substantially identical to the track 36a. For example, the track 36a and the second track 36b may be mirror images of each other about the longitudinal axis A1. The upholstery may be outside the second track 36b and extend to a boundary of the second track 36b. In this situation, the upholstery may include bristles extending partially across the second track 36b. The bristles may assist in preventing debris from entering the second track 36b. The vehicle 10 may include a plurality of second tracks 36b. For example, the number of second tracks 36b may be equal to the number of tracks 36a.

The vehicle 10 includes an airbag assembly 40a. The airbag assembly 40a may include the airbag housing 16a, the airbag 18a, and an inflator 42a. The inflator 42a inflates the airbag 18a to the inflated position, as described further below. The airbag 18a is supported by the track 36a, e.g., via the airbag housing 16a, as shown in FIG. 3. The vehicle 10 may include a plurality of airbag assemblies 40a. For example, a number of airbag assemblies 40a may be equal to a number of recesses 22.

The airbag housing 16a houses the airbag 18a in the uninflated position and supports the airbag 18a in the inflated position. The airbag 18a may be rolled and/or folded to fit within the airbag housing 16a in the uninflated position. The airbag housing 16a may be of any suitable material, e.g., a rigid polymer, a metal, a composite, or a combination of rigid materials. The airbag housing 16a may, for example, include clips, panels 24, etc. for attaching the airbag 18a and for attaching the airbag assembly 40a to the track 36a.

The airbag housing 16a may be supported by the track 36a, as shown in FIG. 9. For example, the airbag housing 16a may be slidably supported by the track 36a, e.g., such that the airbag housing 16a may translate along the longitudinal axis A1. For example, the track 36a may define guides and the airbag housing 16a may include rollers that are designed to roll along the guides.

The airbag 18a in the uninflated position may be between the floor 12 and the upholstery, e.g., the bristles, as shown in FIG. 9. The airbag 18a is inflatable upwardly from the track 36a to the inflated position, e.g., along the vertical axis A3. For example, upon inflation, the airbag 18a may separate the bristles to move to the inflated position.

The airbag 18a is designed to extend alongside the occupant seating area 26 in the inflated position. In the inflated position, the airbag 18a extends along the vertical axis A3 from the floor 12 towards the roof to coverage to a torso and/or hip of an occupant seated in the seating area. The airbag 18a may extend any suitable amount towards the roof in the inflated position. For example, the airbag 18a may be spaced from the roof in the inflated position, e.g., extend to a top of a seat 14. As another example, the airbag 18a may extend to the roof in the inflated position.

Additionally, in the inflated position, the airbag 18a extends along the longitudinal axis A1 to provide coverage to an upper leg and/or knee of the occupant seated in the occupant seating area 26. The airbag 18a may extend along the longitudinal axis A1 less than a recess 22 extends along the longitudinal axis A1. For example, the airbag 18a may extend a same amount the longitudinal axis A1 as a seat 14 bottom of a seat 14 and/or a seat 14 bottom of a personal mobility device 28. The airbag 18a is positioned to be impacted by an occupant in the occupant seating area 26 in the event of a side or oblique vehicle impact, e.g., a near side impact, a near side oblique impact, etc. Since the airbag 18a extends alongside the occupant seating area 26, the airbag 18a will control kinematics of the occupant in the event of the side or oblique vehicle impact.

The airbag 18a may be formed of any suitable airbag material, e.g., from a woven polymer. For example, the airbag 18a may be formed of lightweight high strength orientated-strand fabric material, e.g., from ultra-high molecular weight polyethylene (UHMwPE), such as that commercially available under the tradename Dyneema®, auxetic yarn, etc., to resist tearing and/or puncturing. Other suitable examples include woven nylon yarn, e.g., nylon, polyether ether ketone (PEEK), polyetherketoneketone (PEKK), polyester, or any other suitable polymer. The woven polymer may include a coating such as silicone, neoprene, urethane, polyorganosiloxane, etc.

The airbag 18a may be a single continuous unit, e.g., a single piece of fabric. Alternatively, the airbag 18a may include a plurality of segments, i.e., two or more. The segments may be attached to each other in any suitable fashion, e.g., a plurality of panels 24 attached by stitching, ultrasonic welding, etc.

The inflator 42a is in fluid communication with the airbag 18a. The inflator 42a expands the airbag 18a with inflation medium, such as a gas, to move the airbag 18a from the uninflated position to the inflated position. The inflator 42a may be supported by any suitable component in the vehicle 10. For example, the inflator 42a may be supported by the airbag housing 16a and may move with the airbag 18a relative to the track 36a. The inflator 42a may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 42a may be, for example, at least partially in the inflation chamber to deliver inflation medium directly to the inflation chamber or may be connected to the inflation chamber through fill tubes, diffusers, etc.

The vehicle 10 may include a second airbag assembly 40b. The second airbag assembly 40b may include a second airbag housing 16b, a second airbag 18b, and a second inflator 42b. The second airbag 18b may be supported by the second track 36b, e.g., via the second airbag housing 16b. The vehicle 10 may include a plurality of second airbag assemblies 40b. For example, a number of second airbag assemblies 40b may be equal to a number of recesses 22.

The second airbag housing 16b is substantially identical to the airbag housing 16a. The second airbag housing 16b may be supported by the second track 36b, e.g., in substantially the same manner as discussed above regarding the airbag housing 16a being supported by the track 36a.

The second airbag 18b is substantially identical to the airbag 18a. The second airbag 18b is spaced from the airbag 18a along the lateral axis A2, as shown in FIGS. 8A-8B. That is, the airbag 18a and the second airbag 18b are disposed on opposite sides of the occupant seating area 26 relative to the lateral axis A2. In other words, the second airbag 18b is positioned to be impacted by an occupant in the occupant seating area 26 in the event of a side or oblique vehicle impact, e.g., a far side impact, a far side oblique impact, etc., i.e., to control kinematics of the occupant in the event of the side or oblique vehicle impact. For example, the airbag 18a and the second airbag 18b may be mirror images of each other relative to the longitudinal axis A1.

The second inflator 42b is substantially identical to the inflator 42a. The second inflator 42b may be supported by any suitable component in the vehicle 10. For example, the second inflator 42b may be supported by the second airbag housing 16b and may move with the second airbag 18b relative to the second track 36b.

One or more actuators 44, e.g., hydraulic type, lead-screw type, rack-and-pinion type, etc., may be designed to move the airbag 18a along the longitudinal axis A1, e.g., in response to an instruction from the computer 34. For example, one or more actuators 44 may be designed to move the airbag 18a along the track 36a, e.g., by fixing one end of such actuators 44 to the airbag housing 16a and another end to the track 36a. Additionally, one or more other actuators 44 may move the second airbag 18b along the second track 36b, e.g., by fixing one end of such actuators 44 to the second track 36b and another end to the second airbag housing 16b. Other designs than the example shown in the Figures may be used to move the airbag 18a and/or the second airbag 18b relative to the floor 12, e.g., the airbags 18a may slide along the respective track 36a, etc. The actuators 44 are connected to the computer 34, e.g., the RCM, via a wiring harness (not shown), and the computer 34 transmits signals to and/or receives signals from the actuators 44.

Figure 10:
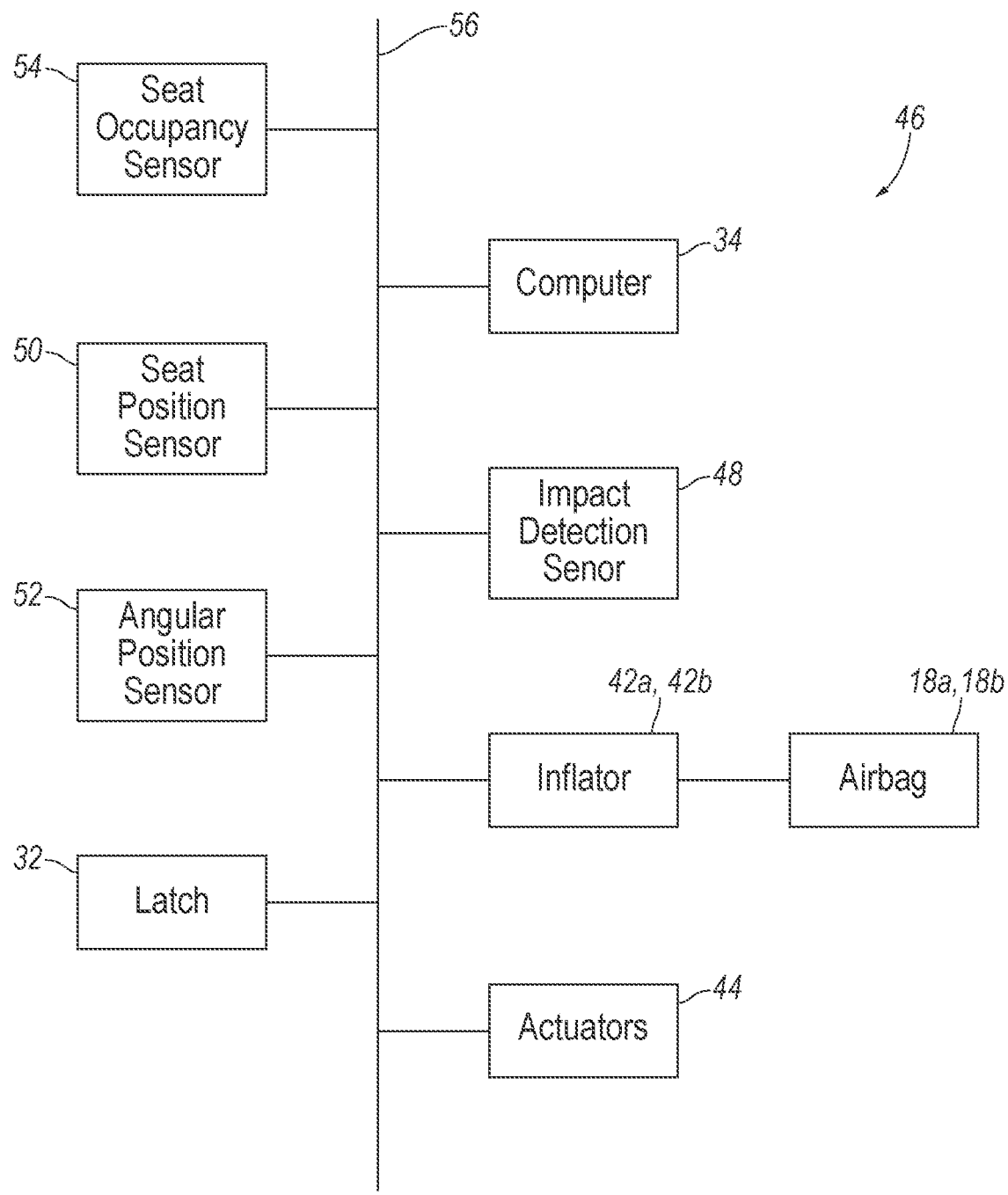
FIG. 10 is a block diagram showing a system of the vehicle.

With reference to FIG. 10, the vehicle 10 may include a control system 46. The control system 46 may include the computer 34, an impact detection sensor 48, a seat position sensor 50, an angular position sensor 52, a seat occupancy sensor 54, the airbag assembly 40a, e.g., the inflator 42a, and the second airbag assembly 40b, e.g., the second inflator 42b, in communication through a vehicle 10 communication network 56.

The computer 34 of the vehicle 10 has a processor and memory storing instructions executable by the processor to control components of the vehicle 10. The memory stores instructions to perform the steps shown in FIG. 8 and as described below. The memory includes one or more forms of computer 34 readable media, and stores instructions executable by the computer 34 for performing various operations, including as disclosed herein. As in the example described above, the computer 34 may be a restraint control module (RCM). The restraint control module may be in communication with and may control the airbag 18a, the second airbag 18b, seatbelt retractors, seatbelt pretensioners, other airbags, etc., in the vehicle 10, among other functions.

The computer 34 may include or be communicatively coupled to, e.g., via a vehicle network such as a communications bus as described further below, more than one processor, e.g., included in components such as sensors, electronic controller units (ECUs) or the like included in the vehicle 10 for monitoring and/or controlling various vehicle components, e.g., a powertrain controller, a brake controller, a steering controller, etc. The computer 34 is generally arranged for communications on the vehicle communication network 56 that can include a bus in the vehicle 10 such as a controller area network (CAN) or the like, and/or other wired and/or wireless mechanisms.

Via the vehicle network, the computer 34 may transmit messages to various devices in the vehicle 10 and/or receive messages (e.g., CAN messages) from the various devices, e.g., sensors, an actuator 44, a human machine interface (HMI), etc. Alternatively or additionally, in cases where the computer 34 actually comprises a plurality of devices, the vehicle communication network 56 may be used for communications between devices represented as the computer 34 in this disclosure. Further, as mentioned below, various controllers and/or sensors may provide data to the computer 34 via the vehicle communication network 56.

The seat occupancy sensor 54 may be programmed to detect occupancy of the seat 14. The seat occupancy sensor 54 may be visible-light or infrared cameras directed at the seat 14, weight sensors inside the seat 14, sensors detecting whether a seatbelt (not shown) for the seat 14 is buckled or unspooled, or other suitable sensors. The seat occupancy sensor 54 is in communication with the computer 34 via the communication network 56. The control system 46 may include any suitable number of seat occupancy sensors 54, e.g., one seat occupancy sensor 54 for each seat 14. The computer 34 may receive one or more signals from the seat occupancy sensors 54 indicating the occupancy of the seat 14.

The seat position sensor 50 may be programmed to detect a position of the seat 14 along the seat track 58. The seat position sensor 50 may be in communication with the computer 34 via the communication network 56. The control system 46 may include any suitable number of seat position sensors 50, e.g., one seat position sensor 50 for each seat 14. The seat position sensor 50 may be mounted to any suitable component of the vehicle 10, e.g., the seat 14, the floor 12, etc. The seat position sensors 50 may be any suitable sensor in the seat 14 (e.g., rotary encoders, Hall-effect sensors, etc.) or exterior to the seat 14 (including cameras, image sensors, etc.). The computer 34 may receive one or more signals from the seat position sensors 50 indicating the position of the seat 14 along the seat track 58.

The angular position sensor 52 is programmed to detect a facing direction of the seat 14, i.e., an orientation of the seat 14 about the vertical axis A3. The angular position sensor 52 may be in communication with the computer 34 via the communication network 56. The control system 46 may include any suitable number of angular position sensors 52, e.g., one angular position sensor 52 for each seat 14. The angular position sensor 52 may be mounted to any suitable component of the vehicle 10, e.g., the seat 14, the rotation mechanism 38, the floor 12, etc. The angular position sensors 52 may be any suitable sensor in the seat 14 (e.g., rotary encoders, Hall-effect sensors, etc.) or exterior to the seat 14 (including cameras, image sensors, etc.).

As one example, the angular position sensor 52 can include a base (not shown) fixed to floor 12 and a rotor (not shown) fixed to the rotation mechanism 38. In such an example, as the rotation mechanism 38 rotates relative to the floor 12, the rotor rotates relative to the base. The angular position sensor 52 can determine an angle of rotation based on the rotation of the rotor relative to the base. As another example, the angular position sensor 52 may be an image sensor. In such an example, the angular position sensor 52 can determine the angle of rotation of the personal mobility device 28, e.g., using image processing techniques, based on detecting a front of the personal mobility device 28. The angle of rotation may be determined relative to the vehicle-forward direction.

The computer 34 may receive one or more signals from the angular position sensors 52 indicating the angle of rotation of the seat 14. The computer 34 can determine the facing direction of the seat 14, e.g., a vehicle-forward direction, a vehicle-rearward direction, etc., by comparing the angle of rotation to angles, e.g., stored in the memory of the computer 34, associated with respective facing directions and selecting the facing direction that corresponds to the angle that matches, e.g., within a threshold, the angle of rotation.

The impact detection sensor 48 may be programmed to detect a vehicle 10 impact to the vehicle 10. The impact detection sensors may be disposed in the vehicle 10. The impact detection sensor 48 may be of various types, e.g., pressure sensor, acceleration sensor, vision sensor, etc. When the vehicle 10 impact occurs, the computer 34 may receive one or more signals from the impact detection sensor 48 indicating the vehicle 10 impact. In response to receiving the signals from the impact detection sensor 48, the computer 34 may initiate the inflation of the airbag 18a. Alternatively, the computer 34 may initiate the inflation of the airbag 18a selectively based on information from the impact detection sensor 48 identifying the physical characteristics of the vehicle 10 impact, e.g., which side of the vehicle 10 impacted, amount of pressure applied to the vehicle 10, etc. and also seat 14 occupancy information, e.g., by using the occupancy sensors 54 sensing the occupancy status of the seats 14. For example, the computer 34 may be programmed to receive a signal that the seat 14 is occupied and instruct the respective inflator 42a to inflate the respective airbag assembly 40a in response to the vehicle 10 impact if the occupancy sensor 54 detects that the seat 14 is occupied.

The computer 34 may be programmed to determine a position of the personal mobility device 28 in the vehicle 10. The position of the personal mobility device 28 may be a translational position, e.g., relative to the vehicle-longitudinal axis A1 and the cross-vehicle axis. For example, the position of the personal mobility device 28 may be a distance of such personal mobility device 28 from the front and/or the rear of the vehicle 10, and a distance of such personal mobility device 28 from the right-side and/or left side of the vehicle 10. The position of each personal mobility device 28 may be identified by the computer 34 based on connection of the panel wiring harness. For example, the computer 34 may store in the memory a look-up table or the like associating various translational positions of recesses 22 with translational positions of the airbag 18a. In other words, the computer 34 can store a translational position for each recess 22 in the floor 12. Upon receiving a signal via the vehicle wiring harness indicating the panel 24 is attached to the vehicle wiring harness and the latch 32 is in the latched position, the computer 34 can determine the position of the personal mobility device 28 is the position of the corresponding recess 22.

The computer 34 may be programmed to determine a facing direction of the personal mobility device 28 in the vehicle 10. That is, the computer 34 may determine a direction the personal mobility device 28 is facing relative to the vehicle 10, e.g., a vehicle-forward direction, a vehicle-rearward direction, etc. For example, the computer 34 may determine the facing direction of the personal mobility device 28 based on an image, as discussed above in regards to the angular position sensor 52.

Upon determining the position and/or the facing direction of the seat 14 (or the personal mobility device 28), the computer 34 may be programmed to initiate movement of the airbag 18a and/or the second airbag 18b. Specifically, the computer 34 may be programmed to instruct the actuators 44 to move the airbag 18a and/or the second airbag 18b based on the position and/or facing direction of the seat 14 (or the personal mobility device 28). The computer 34 may instruct the actuators 44, e.g., via the communication network 56, to translate the airbag 18a relative to the track 36a and/or to translate the second airbag 18b relative to the second track 36b. The computer 34 may translate the airbag 18a and/or the second airbag 18b such that the airbag 18a and/or the second airbag 18b is/are positioned relative to the seat 14 (or the personal mobility device 28) and/or the occupant therein to control kinematics of such occupant. The computer 34 may detect the translational position of the airbag 18a and/or the second airbag 18b, e.g., for use in closed loop positioning of the airbag 18a and/or the second airbag 18b to its commanded positions alongside the seat 14 (or the personal mobility device 28), i.e., the recess 22.

Figure 11:
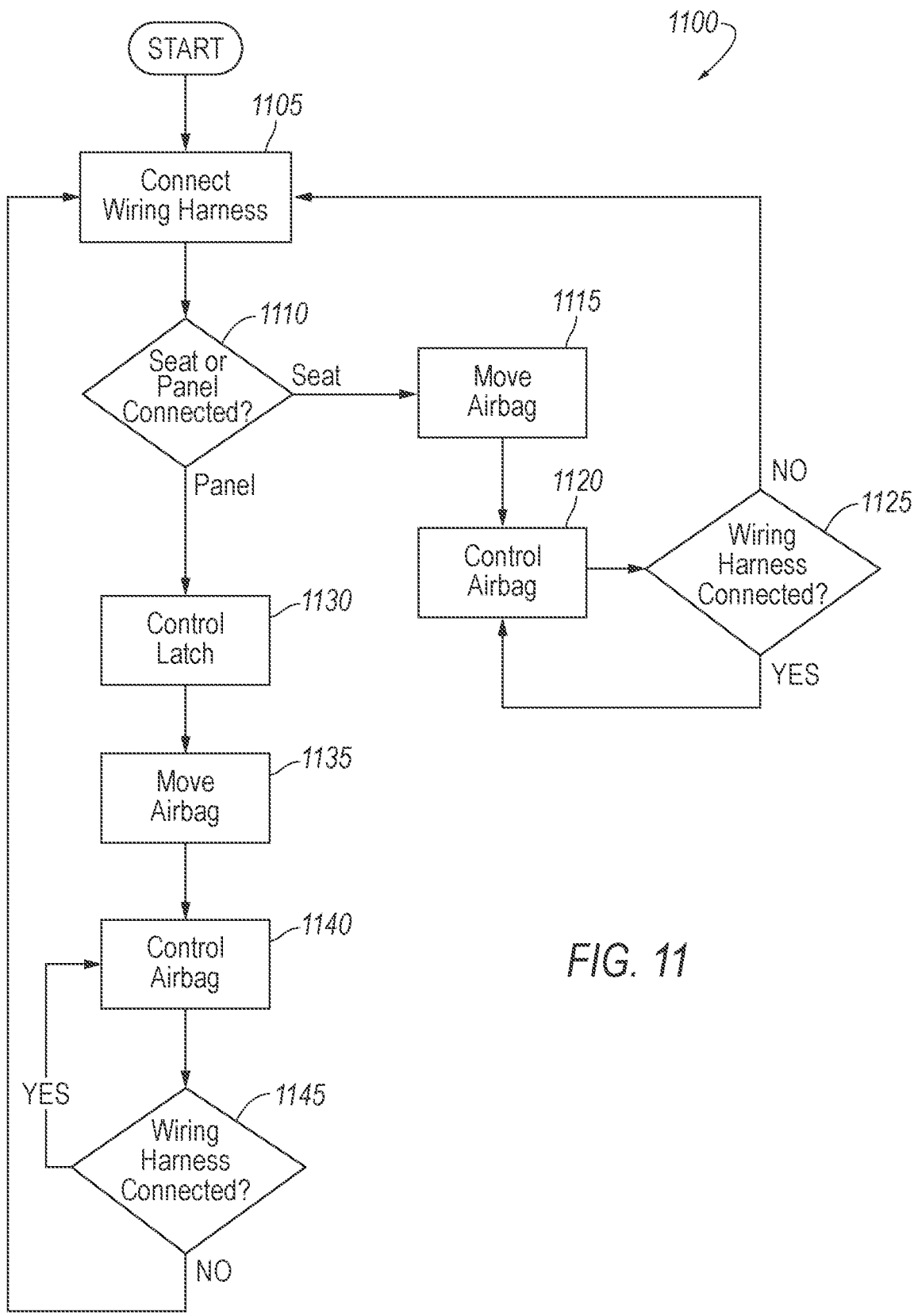
FIG. 11 is a flowchart showing instructions executable by a computer of the vehicle.

With reference to FIG. 11, the computer 34, e.g., RCM, stores instructions to move the airbag 18a and/or the second airbag 18b according to the method 1100 shown in FIG. 8. Specifically, as shown in FIG. 11, the computer 34 determines whether a panel 24 or a seat 14 is connected to the computer 34 and moves the airbag 18a and/or second airbag 18b in response to that determination. The computer 34 may perform the method 1100 for each vehicle wiring harness to individually move airbags 18a and/or second airbags 18b disposed alongside each occupant seating area 26. "In response to" and "based on" are used throughout this text to indicate a causal relationship, not merely a temporal relationship. For example, the computer 34 moves the airbag 18a and/or the second airbag 18b as a direct result of determining whether the seat 14 or the panel 24 is connected to the computer 34.

With reference to block 1105, the method includes connecting a wiring harness to the computer 34, as described above. For example, this may include the connection of the panel wiring harness to the vehicle wiring harness or the connection of the seat wiring harness to the vehicle wiring harness. The method 1100 continues in a block 1110.

With reference to the block 1110, the computer 34 determines whether the panel 24 is connected to the computer 34 or the seat 14 is connected to the computer 34. Specifically, as set forth above, the vehicle wiring harness transmits signals to and from the computer 34. When the seat wiring harness is connected to the vehicle wiring harness, signals from components of the seat 14 to the computer 34 and signals from the computer 34 to components of the seat 14 are communicated through the seat wiring harness and the vehicle wiring harness. When the panel wiring harness is connected to the vehicle wiring harness, signals from the latch 32 to the computer 34 and signals from the computer 34 to the latch 32 are communicated through the panel wiring harness and the vehicle wiring harness. The computer 34 may identify the seat 14 or the panel 24 based on these communications. For example, when connected to the panel 24 wiring harness, the computer 34 may detect signals or other indicators from the latch 32 to identify that the panel 24 is connected to the computer 34. When connected to the seat wiring harness, the computer 34 may detect signals or other indicates from one or more components of the seat 14, e.g., a seatbelt retractor, a seat sensor, etc., to identify that the seat 14 is connected to the computer 34. As shown in FIG. 11, the operation of the computer 34, i.e., which instructions are used, is based on the determination in block 1110.

With reference to block 1130, when the panel 24 is installed in the vehicle 10, the computer 34 may include instructions to control operation of the latch 32 based on detection of the panel 24. For example, the computer 34 may move the latch 32 between the latched and unlatched position. Specifically, the computer 34 may move the latch 32 based on an automatic identification that a personal mobility device 28 is present on the panel 24 and/or may be based on manual input from an occupant that a personal mobility device 28 is on the panel 24, e.g., through a human-machine interface. As another example, the computer 34 may receive a signal from the latch 32 that the latch 32 is in the latched position or the unlatched position. The computer 34 may use this information to control operation of the airbag 18a and/or to prevent motion of the vehicle 10. The method 1100 continues in a block 1135.

With reference to block 1135, when the personal mobility device 28 is present on the panel 24, i.e., the latch 32 is in the latched position, the computer 34 may include instructions to control the actuators 44. That is, the computer 34 may include instructions to move the airbag 18a and/or the second airbag 18b. Specifically, the computer 34 may determine the position and the facing direction of the personal mobility device 28 relative to the vehicle 10, as discussed above. The computer 34 can then control the actuators 44 to move the airbag 18a and/or the second airbag 18b to correspond to a position and a facing direction of the personal mobility device 28. In other words, the airbag 18a and/or the second airbag 18b may move relative to the track 36a to align with the personal mobility device 28, e.g., along the longitudinal axis A1. The method 1100 continues in a block 1140.

Specifically, with reference to block 1140, the computer 34 may include instructions to control inflation of the airbag 18a and/or the second airbag 18b based on the detection of the panel 24. Specifically, the computer 34 may control inflation timing, inflation pressure (e.g., with variable control of one or more inflators 42 as is known), airbag 18 thickness and/or stiffness (e.g., by controlling internal tethers of the airbag(s) 18 as is known) in a way suitable for an occupant of a personal mobility device 28 supported by the panel 24 in the event of a vehicle 10 impact. In other words, an occupant of a personal mobility device 28 on the panel 24 may be positioned differently than an occupant in a seat 14, and the operation of airbag 18a and/or the second airbag 18b is tailored to the position of the occupant in the personal mobility device 28 when the panel 24 is detected in block 1110. The method 1100 continues in a block 1145.

With reference to block 1115, when the seat 14 is installed in the vehicle 10, the computer 34 may include instructions to control the actuators 44. That is, the computer 34 may include instructions to move the airbag 18a and/or the second airbag 18b. Specifically, the computer 34 may determine the position and the facing direction of the seat 14 relative to the vehicle 10, as discussed above. The computer 34 can then control the actuators 44 to move the airbag 18a and/or the second airbag 18b to correspond to a position and a facing direction of the seat 14. In other words, the airbag 18a and/or the second airbag 18b may move relative to the track 36a or second track 36b, respectively, to align with the seat 14, e.g., along the longitudinal axis A1. The method 1100 continues in a block 1120.

With reference to block 1120, when the seat 14 is installed in the vehicle 10, the computer 34 may include instructions to control to control inflation of the airbag 18a and/or the second airbag 18b based on the detection of the seat 14. Specifically, the computer 34 may control inflation timing, inflation pressure (e.g., with variable control of one or more inflators 42 as is known), airbag 18 thickness and/or stiffness (e.g., by controlling internal or external tethers of the airbag(s) 18 as is known) in a way suitable for the occupant of the seat 14 in the event of a vehicle 10 impact. In other words, an occupant of the seat 14 may be positioned differently than an occupant in a personal mobility device 28 on the panel 24, and the operation of the to control the airbag 18*a* and/or the second airbag 18*b* are tailored to the position of the occupant on the seat 14 when the seat 14 is detected in block 1110. The method 1100 continues in a block 1125.

As shown in blocks 1125 and 1145, the computer 34 may detect a disconnection of the panel wiring harness or the seat wiring harness from the vehicle wiring harness. As another example, the computer 34 may detect a connection of a different wiring harness to the vehicle wiring harness. In either scenario, as shown at blocks 1125 and 1145, the computer 34 restarts the method 1100.

Computing devices, such as the computer 34, generally include computer-executable instructions, where the instructions may be executable by one or more computing devices such as those listed above. computer-executable instructions may be compiled or interpreted from computer programs created using a variety of programming languages and/or technologies, including, without limitation, and either alone or in combination, Java™ C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

The invention claimed is:

1. A vehicle, comprising:
a floor;
a seat supported by the floor, the seat being translatable relative to the floor along a vehicle-longitudinal axis;
an airbag housing supported by the floor and disposed alongside the seat, the airbag housing being translatable relative to the floor and the seat along the vehicle-longitudinal axis; and
an airbag supported by the airbag housing, the airbag being inflatable to an inflated position that extends from the airbag housing away from the floor.

2. The vehicle of claim 1, further comprising a track mounted to the floor and elongated along the vehicle-longitudinal axis, the airbag housing being slidably engaged with the track, and the seat being translatable relative to the track.

3. The vehicle of claim 2, wherein the track is disposed outboard of the seat relative to a vehicle-lateral axis.

4. The vehicle of claim 1, further comprising a computer having a processor and a memory storing instructions executable by the processor to move the airbag based on determining a position of the seat.

5. The vehicle of claim 4, wherein the memory stores further instructions executable by the processor to control inflation of the airbag based on an occupancy of the seat.

6. The vehicle of claim 4, wherein the seat is rotatable relative to the floor about a vertical axis, the memory storing further instructions executable by the processor to move the airbag additionally based on determining an orientation of the seat about the vertical axis.

7. The vehicle of claim 1, further comprising an actuator supported by the floor and designed to translate the airbag housing relative to the floor and the seat.

8. The vehicle of claim 1, wherein the seat defines an occupant seating area, the airbag is designed to extend alongside the occupant seating area in the inflated position.

9. The vehicle of claim 1, further comprising a panel removably attached to and supported by the floor, the panel being designed to engage a personal mobility device.

10. The vehicle of claim 9, further comprising a computer having a processor and memory storing instructions executable by the processor to move the airbag based on determining a position of the panel.

11. The vehicle of claim 10, wherein the memory stores further instructions executable to control inflation of the airbag based on detecting a personal mobility device engaged with the panel.

12. The vehicle of claim 1, further comprising:
a second airbag housing supported by the floor and disposed alongside the seat opposite the airbag housing, the second airbag housing being translatable relative to the floor and the seat along the vehicle-longitudinal axis; and
a second airbag supported by the second airbag housing, the second airbag being inflatable to an inflated position that extends from the second airbag housing away from the floor.

13. The vehicle of claim 12, wherein the seat defines an occupant seating area, the airbag and the second airbag being spaced from each other along a cross-vehicle axis and each being designed to extend alongside the occupant seating area in the inflated position.

14. The vehicle of claim 12, further comprising a computer having a processor and a memory storing instructions executable by the processor to move the airbag and the second airbag based on determining a position of the seat.

15. A system, comprising a computer including a processor and a memory, the memory storing instructions executable by the processor to:
- determine a position of a seat in response to determining the seat is attached to a floor of a vehicle; and
- move an airbag along the floor relative to the floor and the seat based on the position of the seat.

16. The system of claim 15, wherein the memory stores further instructions executable by the processor to, upon determining an orientation of the seat, move the airbag along the floor additionally based on the orientation of the seat.

17. The system of claim 15, wherein the memory stores further instructions executable by the processor to control inflation of the airbag based an occupancy of the seat.

18. The system of claim 15, wherein the memory stores further instructions executable by the processor to move a second airbag along the floor based on the position of the seat, the seat being disposed between the airbag and the second airbag.

19. The system of claim 15, wherein the memory stores further instructions executable by the processor to:
- determine a position of a panel in response to determining the panel is attached to the floor; and
- move the airbag along the floor based on the position of the panel.

20. The system of claim 19, wherein the memory stores further instructions executable by the processor to control inflation of the airbag in response to a personal mobility device being engaged with the panel.

* * * * *